(12) United States Patent
Fregly et al.

(10) Patent No.: US 11,392,662 B1
(45) Date of Patent: Jul. 19, 2022

(54) ATTRIBUTE INHERITANCE OF RELATED OBJECTS FOR A DIGITAL OBJECT ARCHITECTURE

(71) Applicant: VERISIGN, INC., Reston, VA (US)

(72) Inventors: Andrew Fregly, Reston, VA (US); Swapneel Sheth, Fairfax, VA (US); Najmehalsadat Miramirkhani, Stony Brook, NY (US)

(73) Assignee: VeriSign, Inc., Reston, VA (US)

( * ) Notice: Subject to any disclaimer, the term of this patent is extended or adjusted under 35 U.S.C. 154(b) by 106 days.

(21) Appl. No.: 16/041,587

(22) Filed: Jul. 20, 2018

(51) Int. Cl.
*G06F 9/445* (2018.01)
*G06F 16/955* (2019.01)
*G06F 9/448* (2018.01)

(52) U.S. Cl.
CPC ........ *G06F 16/9566* (2019.01); *G06F 9/4492* (2018.02); *G06F 9/44505* (2013.01)

(58) Field of Classification Search
None
See application file for complete search history.

(56) References Cited

U.S. PATENT DOCUMENTS

| | | | | |
|---|---|---|---|---|
| 7,559,034 B1* | 7/2009 | Paperny | ............. | G06F 9/44526 715/803 |
| 8,489,930 B1* | 7/2013 | Sim-Tang | ............. | G06F 16/211 714/38.1 |
| 8,510,443 B2* | 8/2013 | Kim | ................... | G06F 16/9535 709/224 |
| 9,769,213 B1* | 9/2017 | Madisetti | ................ | H04L 63/20 |
| 9,935,772 B1* | 4/2018 | Madisetti | .............. | H04L 9/0891 |
| 11,256,702 B2* | 2/2022 | Colcord | ................... | G06F 9/544 |
| 2009/0037558 A1* | 2/2009 | Stone | ...................... | G06F 21/10 709/218 |
| 2010/0082774 A1* | 4/2010 | Pitts | ..................... | H04N 21/654 709/219 |
| 2013/0325637 A1* | 12/2013 | Jiang | .................. | G06Q 30/0276 705/14.72 |
| 2014/0143283 A1* | 5/2014 | Sim-Tang | ........... | G06F 11/3664 707/802 |
| 2018/0260302 A1* | 9/2018 | Mola | ..................... | G06F 16/328 |
| 2018/0267910 A1* | 9/2018 | Goldberg | ............ | G06F 13/1673 |

* cited by examiner

*Primary Examiner* — Dhairya A Patel
(74) *Attorney, Agent, or Firm* — Baker Botts L.L.P.; Michael A. Sartori

(57) ABSTRACT

For digital objects registered via the DOA infrastructure, attribute inheritance is enabled between related objects using naming conventions for the handle IDs or data models for handle data. Each child object of a parent object may automatically inherit at least one predetermined attribute of the parent object. When a retriever machine (local handle registry or client machine) obtains a handle ID for a digital object, the retriever machine may determine that the digital object is a child object of a parent object, determine a handle ID for the parent object, obtain the author attribute from the handle data of the parent object, and associate the author attribute of the parent object with the child object. The retriever machine may determine that the digital object is a child object of the parent object via naming conventions for handle IDs or via data models for the handle data.

18 Claims, 12 Drawing Sheets

ATTRIBUTE INHERITANCE OF RELATED OBJECTS FOR A DIGITAL OBJECT ARCHITECTURE

BACKGROUND

Field of the Various Embodiments

The present invention relates generally to digital objects and, more specifically, to attribute inheritance of related objects for a digital object architecture.

Description of the Related Art

The World Wide Web includes a multitude of interconnected web servers that store and provide access to various types of digital resources, including web pages, images, movie files, documents, and so forth. A user of the World Wide Web can access a given digital resource (digital object) via a uniform resource locator (URL). The URL includes a domain name corresponding to the web server that stores the digital resource and a path segment indicating the location of the digital resource on that web server. When the user accesses the URL via a browser, the browser may use domain name system (DNS) resolution to map the domain name portion of the URL to an internet protocol (IP) address corresponding to the web server. The browser then connects to the web server using that IP address and submits a request for the digital resource to the web server. The request includes the path segment portion of the URL. The web server retrieves the digital resource using the path segment and, finally, returns the digital resource to the user via the browser.

If the digital resource is moved to a different location on the web server, moved to a different web server, or removed from the web server altogether, then the associated URL can no longer be used to access the digital resource. One consequence of this particular issue is that many web servers and corresponding web pages are associated with URLs that cannot be used to access underlying digital resources and are therefore considered to be "broken."

To address the problem of broken URLs, a digital object identifier approach has been defined as part of the digital object architecture (DOA). In the context of DOA, the term "digital object" may refer to, for example, any type of data having any format and, in some cases, any associated metadata, that is stored within a DOA infrastructure. For example, and without limitation, a given digital object could be a Unicode text file, a Motion Picture Experts Group (MPEG) movie, a Portable Document Format (PDF) document, a Portable Network Graphics (PNG) image, a JavaScript Object Notation (JSON) object, a server location, a service endpoint, or any combination of such data.

The digital object identifier approach mentioned above provides a mechanism for tracking and maintaining digital objects within the World Wide Web. The tracking mechanism may use, for example, a unique handle identifier ("handle ID") to identify a digital object and have these identifiers and a handle identified by the Handle ID registered into globally-accessible handle registries. Registered handle IDs can then serve as lookup keys for handles in handle registries, with identified handles providing the current location of the digital object (e.g., where the digital object is stored and resides) associated with a handle ID. This technique allows the current location of a digital object to be retrieved from a handle registry, so long as the handle for the digital object is updated with the digital object's location when the digital object moves. The effect of this is that handle IDs can serve as permanent identifiers for use in retrieving digital objects. The DOA paradigm addresses the "broken" URL problem that can occur when URLs are used as digital object identifiers. Object Notation (JSON) object, a server address, a service endpoint, and any combination thereof. For example, repositories may store digital objects.

In the DOA paradigm, a digital object is assigned a handle identifier (ID) that may include a prefix portion and a suffix portion. The prefix portion of the handle ID may define a namespace within the handle system and indicate a specific local handle registry that manages the handle for the digital object and associated metadata included within the handle. The suffix portion of the handle ID may comprise an identifier that is unique within the namespace identified by the prefix. A handle ID may correspond to the digital object regardless of the location of the digital object within the World Wide Web. Accordingly, the digital object can be located via the handle ID even when the location of the digital object changes. The metadata associated with a digital object may be stored in the local handle registry that manages the digital object and the associated metadata. For each digital object, the associated metadata may be stored in one or more records ("handle data") specifying a series of attribute/value pairs for the digital object. For example, the associated metadata may include attribute/value pairs that indicate, among other things, the author, owning organization, and one or more locations where the digital object resides.

One drawback of managing digital objects through the DOA infrastructure is that updating attributes of related digital objects is difficult and time consuming for administrators/users who register digital objects with the DOA infrastructure. Typically, to update a particular attribute for a group of related digital objects, the handle records (handle data) for the handle of each digital object, for example, are individually updated, which is time consuming when the group of related digital objects is particularly large and continues to grow over time. For example, a group of digital objects may comprise all invention disclosure reports for a particular company/organization that over several years includes thousands of invention disclosure reports. If the name of the organization has changed, then to update the "owning organization" field in handles for all the invention disclosure reports would require an administrator to individually update the handle data for thousands of invention disclosure reports to reflect the new name of the organization. Further, storing the same particular attribute in the handle data in each digital object of a group of related digital objects consumes storage resources of the DOA infrastructure. This drawback is particularly significant if there are several common attributes for a large number of related digital objects, whereby the handle data in handles for each such digital object individually stores the several common attributes.

As the foregoing illustrates, what is needed in the art are more effective techniques for managing attributes for related digital objects within the DOA infrastructure.

SUMMARY

Various embodiments of the present application set forth a method for attribute inheritance between related digital objects in a digital object architecture (DOA). The method may include obtaining, at a retriever machine, a first handle identifier (ID) for a first digital object, based on the first handle ID, determining that the first digital object is a child object of a second digital object and determining a second handle ID for the second digital object. The method may further include, based on the second handle ID, obtaining handle data for the second digital object, the handle data specifying at least one attribute for the second digital object and associating the at least one attribute for the second digital object with the first digital object.

Various embodiments of the present application set forth another method for attribute inheritance between related digital objects in a digital object architecture (DOA). The method may include obtaining, at a retriever machine, handle data for a first digital object, the handle data specifying a parent attribute indicating that the first digital object is a child object of a second digital object and a handle identifier (ID) for the second digital object. The method may further include, based on the handle ID for the second digital object, obtaining handle data for the second digital object which specifies at least one attribute for the second digital object and associating the at least one attribute for the second digital object with the first digital object.

Other embodiments of the present application may include alternate mechanisms for indicating that a handle is a child object of a second digital object. For example, a naming convention or mapping service could be used that identifies parent-child relationships between handles. In another example, attestations cryptographically signed by a trusted third-party could establish parent-child relationships. Other mechanisms may be readily apparent to those with some skill in the art.

At least one advantage of embodiments disclosed herein is that at least one attribute of related digital objects registered in the DOA infrastructure may be automatically inherited between the related digital objects. In particular, each child object may be automatically associated with at least one predetermined attribute of a parent object via naming conventions for handle IDs or data models for handle data or via other methods of establishing parent-child relationships known to those with some skill in the art. Therefore, the at least one predetermined attribute of the parent object does not need to be added to the handle data for each child object of the parent object, which reduces administrative overhead of adding the at least one predetermined attribute to the handle data for each child object as well as reduces the consumption of storage resources on the DOA infrastructure. Further, when a predetermined attribute of the parent object is updated, the updated predetermined attribute is automatically associated with each child object without requiring an update of the handle data of each child object of the parent object.

BRIEF DESCRIPTION OF THE DRAWINGS

So that the manner in which the above recited features of the various embodiments can be understood in detail, a more particular description of the various embodiments, briefly summarized above, may be had by reference to embodiments, some of which are illustrated in the appended drawings. It is to be noted, however, that the appended drawings illustrate only typical embodiments and are therefore not to be considered limiting of its scope, for the various embodiments may admit to other equally effective embodiments.

DETAILED DESCRIPTION

In the following description, numerous specific details are set forth to provide a more thorough understanding of the various embodiments. However, it will be apparent to one of skill in the art that various embodiments may be practiced without one or more of these specific details.

I. System Overview

Figure 1:
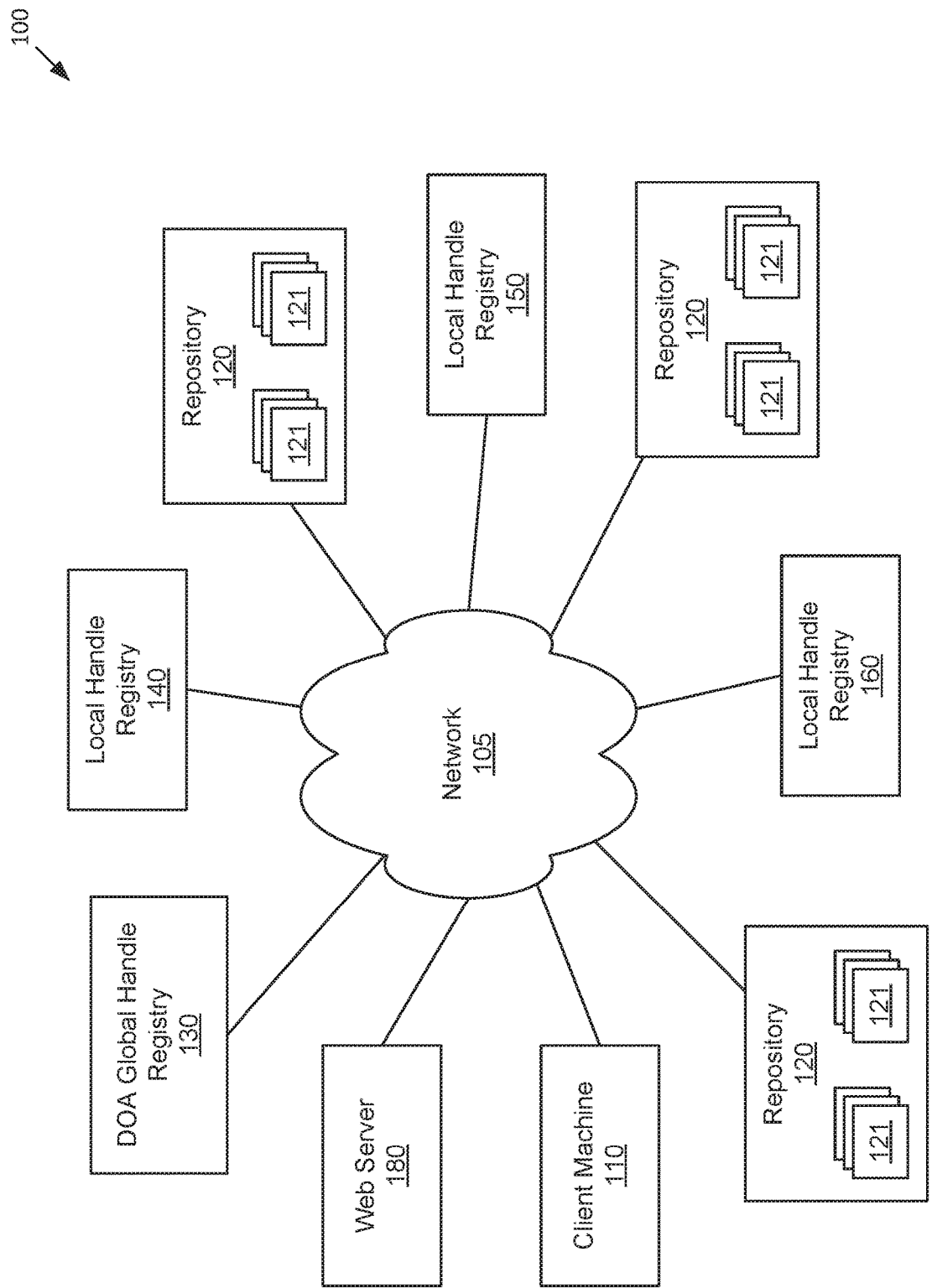
FIG. 1 is a block diagram illustrating a distributed computing system configured to implement one or more aspects of the various embodiments.

FIG. 1 is a block diagram illustrating a distributed computing system 100 configured to implement one or more aspects of the various embodiments. Distributed computing system 100 is based on the digital object architecture (DOA), which is a general architecture for distributed information storage, location, and retrieval over the Internet. DOA provides a framework of identity management capable of supporting a broad range of applications, including, for example, but not limited to, intellectual property, academic research and archives, big data, the Internet of Things, cloud computing, smart cities, and the like. DOA may organize digital objects by assigning a unique identifier, or "handle ID," to each digital object, where the handle ID is disassociated from the current storage location of the digital object being identified. Specifically, each handle ID may provide indirect access to a particular digital object by means of a reference/pointer included in a handle that is updated whenever the digital object is relocated to a different server or other repository, where the handle is comprised of one or more records identified by the handle ID and is stored and retrievable from a handle registry. As a result, relocation of a digital object to a different server does not render the handle ID obsolete.

Distributed computing system 100 may include a client machine 110, at least one or a plurality of repositories 120, a DOA global handle registry 130, one or more DOA local handle registries 140, 150, and 160, and a web server 180 in communication with each other via a network 105. Network 105 may be any suitable environment to enable communications among remote or local computer systems and computing devices, including, for example and without limitation, cross connect systems within a data center, dedicated low-latency networks, LANs (Local Area Networks), and internet-based WANs (Wide Area Networks).

A DOA infrastructure may include the plurality of repositories 120, which act as the DOA storage component, and the DOA global handle registry 130 and the local handle registries 140, 150, and 160, which together act as the DOA registry component. The DOA global handle registry 130 and local handle registries 140, 150, and 160 may operate in conjunction to implement a handle system that resolves the handle ID for a particular digital object to a handle that includes the current location storing that digital object. A client machine 110 may interface with the DOA global handle registry 130 and the appropriate local handle registry to access the handle with handle data for a particular digital object 121. In an embodiment, the client machine 110 interfaces with the DOA storage component and/or the DOA registry component via a web browser executing on the client machine 110.

A digital object 121 may be, for example, a specific piece of content or service that resides on one of repositories 120 and can be accessed via the Internet. As referred to herein, a "digital object" broadly refers to any technically feasible type of data or service or system included in a DOA infrastructure. According to an embodiment, a digital object 121 may also reference service endpoints and/or servers. Each of repositories 120 may be, for example, a storage component for storing digital objects 121, such as a web server or any other computing device connected to the Internet. Clients of a given repository 120 may add, access, update, and/or delete digital objects 121 stored therein.

DOA global handle registry 130 and DOA local handle registries 140, 150, and 160 may implement the handle system that resolves the handle ID for a particular digital object 121 to the handle including the current storage location for that digital object 121. To that end, DOA global handle registry 130 may manage the root of the handle system hierarchy, allocating and storing unique prefixes to each of local handle registries 140, 150, and 160 for that prefix, and providing a global service for mapping prefixes to the appropriate local handle registry. According to an embodiment, local handle registries 140, 150, and 160 make up a second level of the handle system hierarchy under the root, and maintain a prefix from which sub-prefixes can be allocated. Each of local handle registries 140, 150, and 160 can have a separate hierarchical structure and can also replicate horizontally in multiple sites. Further, in some embodiments, each of local handle registries 140, 150, and 160 stores a replica of DOA global handle registry 130.

According to an embodiment, each of local handle registries 140, 150, and 160 may manage a set of handles including handle data associated with the digital objects. For each digital object, the local handle registry may store the associated handle data in a handle comprised of a set of one or more records that specify a series of attribute/value pairs for the digital object. For example, the set of records in a handle for a digital object may include, for example, attribute/value pairs that indicate the author, owning organization, state information, access methods and rights, cryptographic key, and/or permissions. The handle data for a digital object may also include a reference/pointer to a current storage location of the digital object 121 or an access mechanism for the digital object 121. Typically, the reference/pointer identifies the appropriate repository 120 storing the digital object 121 and an identifier for the digital object 121 within that repository 120. For example, the reference/pointer may comprise an IP address, a URL, and the like. A client 110 may use the reference in accessing the digital object 121 of interest. As used herein, a "handle data" of a particular digital object 121 refers to the set of one or more records included in a handle and associated with the particular digital object 121. Each of local handle registries 140, 150, and 160 may store a plurality of handles that are each associated with a respective digital object 121 stored in one of repositories 120.

According to an embodiment, each handle ID for a digital object 121 may be unique and independent of the underlying physical or logical system employed in the storage of the digital object 121. A handle ID may include, for example, a prefix portion and a suffix portion. The prefix portion may define, for example, a namespace within the handle system and may be associated with a particular naming authority. The prefix portion of the handle ID may indicate, for example, a specific local handle registry 140, 150, and 160 that manages the handle for the digital object and associated metadata included in the handle. The suffix portion of the handle ID may comprise an identifier for a handle and associated digital object 121 within the namespace identified by prefix portion, and may correspond to a particular digital object 121 regardless of the location of that particular digital object 121. Further, the suffix portion may be, for example, a text string that is unique relative to the prefix portion. Handle prefixes may be structured hierarchically, and a prefix manager can allocate sub-prefixes separated by a period. The hierarchy of the handle system may be written left to right (xxx.yyy). For example, in the handle system, the US Library of Congress has been allocated the handle prefix "loc," and can then allocate the sub-prefix "natlib" for its own purposes. The complete handle prefix would be "loc.natlib." In DNS, for example, the Library of Congress has the domain name of loc.gov, and has created the subdomain for natlib whose domain name is "natlib.loc.gov." In an embodiment, each handle ID may include any Unicode 2.0 characters.

In operation, the client machine 110 may execute a web browser interface with a web server 180 that provides the web browser with one or more handle IDs corresponding to one or more digital objects. For each digital object, the client machine 110 may send a handle query to DOA global handle registry 130 including a particular handle ID associated with the digital object 121 of interest. Based on the prefix portion included in the handle ID, DOA global handle registry 130 may return service information to client 110 indicating which of local handle registries 140, 150, or 160 manages that particular handle prefix. The remaining discussion assumes, for ease of explanation only, that the DOA global handle registry 130 returns service information to the client 110 indicating that the local handle registry 160 manages that particular handle prefix. Persons skilled in the art would readily recognize that a similar process would be applicable to any other local handle registry within the DOA infrastructure.

In response to receiving the service information from the DOA global handle registry 130, client 110 may send a handle request for the handle for digital object 121 to the appropriate local handle registry, e.g., local handle registry 160, the handle request comprising the handle ID of the digital object 121. Based on the namespace identified with the prefix portion of the handle ID and the suffix portion included in the handle ID, the local handle registry 160 may then identify and retrieve the appropriate handle (one or more records) for the digital object 121. The returned handle data may include, for example, a reference/pointer to a current storage location for the digital object 121 or an access mechanism for the digital object 121. The client machine 110 may receive the handle data and use the reference/pointer to access a repository 120 storing the digital object 121, and access and retrieve the digital object 121 from the repository 120.

Thus, in operation, the DOA global handle registry 130 and the local handle registries 140, 150, or 160 may interoperate to service requests for handles of digital objects from clients 110. Each such request may include the handle ID of a requested handle. To service a given request, the DOA global handle registry 130 may map the prefix portion of the handle ID included in the request to a specific local handle registry. Then, the specific local handle registry may retrieve the handle for a digital object based on the namespace identified with the prefix portion of the handle ID and the suffix portion of the handle ID.

Figure 2:
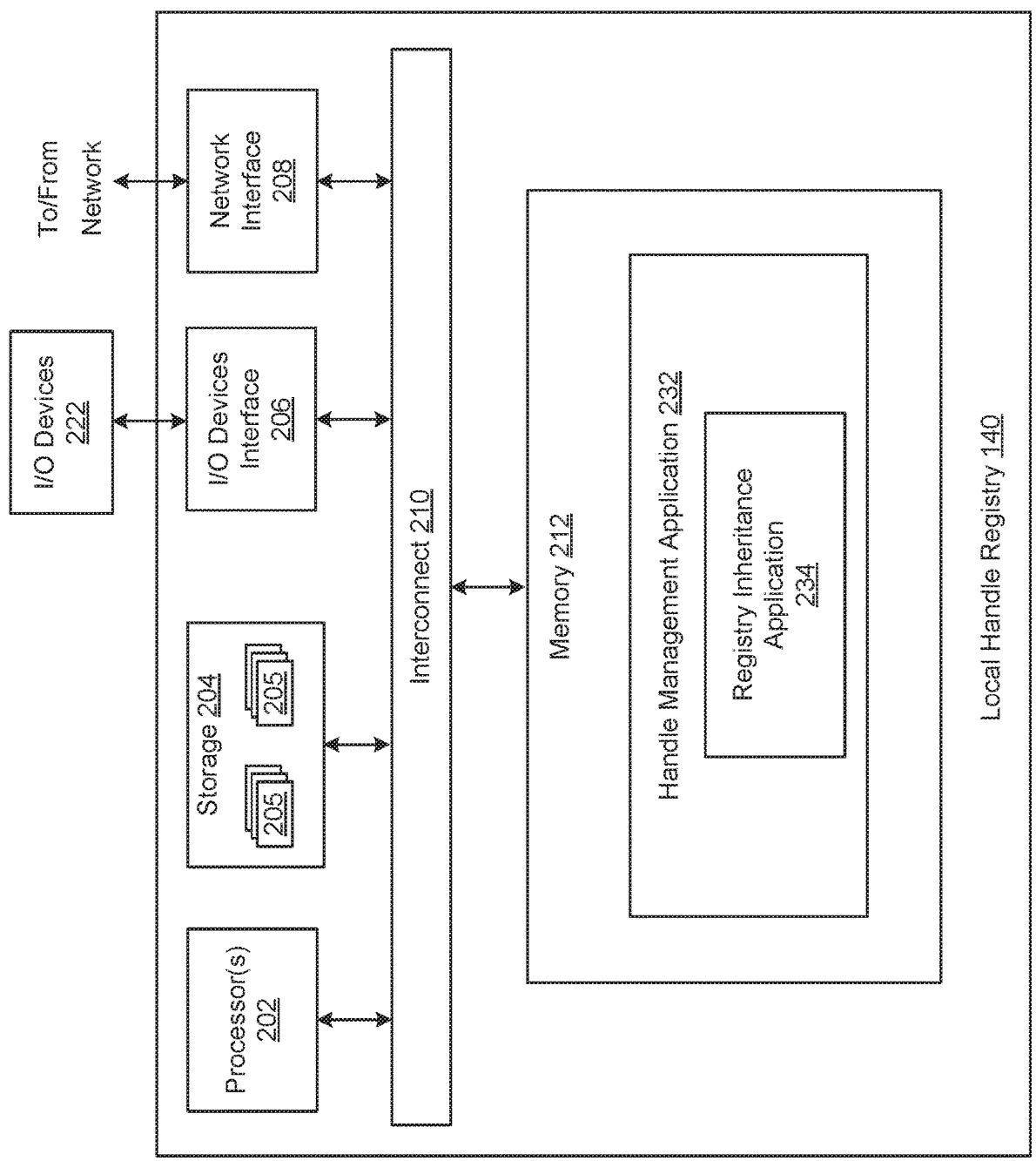
FIG. 2 is a more detailed illustration of a local handle registry of FIG. 1, according to various embodiments.

FIG. 2 is a more detailed illustration of a local handle registry 140 of FIG. 1, according to various embodiments. The local handle registry 140 may include, for example and without limitation, a computing device or machine that may be a standalone server, a cluster or "farm" of servers, one or more network appliances, or any other device suitable for implementing one or more aspects of the various embodiments. As shown, the local handle registry 140 includes, without limitation, a central processing unit (CPU) 202, storage 204, an input/output (I/O) devices interface 206, a network interface 208, an interconnect 210, and a system memory 212. The description of the various components and functions provided herein for the local handle registry 140 may also apply to the local handle registries 150 and 160.

Processor 202 may be any technically feasible hardware unit configured to process data and execute program instructions. Processor 202 could be, for example, a central processing unit (CPU), a graphics processing unit (GPU), an application specific integrated circuit (ASIC), and any combination thereof. The processor 202 retrieves and executes programming instructions stored in the system memory 212. Similarly, the processor 202 stores and retrieves application data residing in the system memory 212. The interconnect 210 facilitates transmission, such as of programming instructions and application data, between the processor 202, input/output (I/O) devices interface 206, storage 204, network interface 208, and system memory 212. Processor 202 communicates to other computing devices and systems via network interface 208, where network interface 208 is configured to transmit and receive data via a communications network. The I/O devices interface 206 is configured to receive input data from user I/O devices 222. The I/O devices 222 include devices for receiving input, devices for providing output, and devices for both receiving input and providing output. For example, I/O devices 222 may include a keyboard, a mouse or other pointing device, a speaker, a display device, and/or a touchscreen configured to receive input and provide output.

The storage 204 may include, without limitation, a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). As described in relation to FIG. 1, each of local handle registries 140, 150, and 160 may manage handles for a set of digital objects and metadata associated with the set of digital objects. For each digital object, the local handle registry may store the associated metadata in a handle including a set of one or more records that specify a series of attribute/value pairs for the digital object. "Handle" of a particular digital object 121 is identified by the handle identifier (ID) and includes a set of one or more records (handle data) contained in the handle and associated with the particular digital object 121. As shown, the storage 204 of local handle registry 140 may store a set of handles for the set of digital objects 121 that the local handle registry 140 manages, each handle 205 being associated with a respective digital object 121.

Memory 212 may include any technically feasible storage medium for storing data and software applications. Memory 212 could be, for example, a random access memory (RAM) module. The memory 212 may include, without limitation, a handle management application 232 and a registry inheritance application 234. The handle management application 232, when executed by the processor 202, performs one or more operations associated with the local handle registry 140. The handle management application 232 may generate and assign a handle ID to a digital object 121 when a handle associated with the digital object 121 is created and stored to the local handle registry 140. Alternatively, the handle ID may be provided by the entity registering the handle. The handle ID could also be determined based on a naming convention, or the handle ID could be derived from other mechanisms that assure that the handle ID is unique. In addition, the handle management application 232 may receive and service handle requests from client machines 110. Each handle request may include, for example, a handle ID for a handle 205 of a digital object 121 that is managed by the local handle registry 140. The handle ID may include, for example, a suffix portion that uniquely identifies the handle within a namespace identified by the prefix portion of the handle ID where the local handle registry 140 manages the namespace and the handle ID is associated with the digital object 121. Based on the handle ID, the handle management application 232 may then retrieve the handle 205 associated with the requested digital object 121 from storage 204 and return the handle 205 to the requesting client machine 110.

The registry inheritance application 234 may comprise a plug-in application or software component of the handle management application 232 and provide functions and operations set forth in the embodiments described herein. In some embodiments, the registry inheritance application 234 may enable the handle management application 232 to provide automatic inheritance of at least one predetermined attribute between related digital objects. In particular, each child object of a parent object may automatically inherit at least one predetermined inherited attribute of the parent object. For example, an author attribute of the parent object may be specified in the handle data for the parent object. The parent object may have a first child object that has handle data that does not specify an author attribute. After the handle management application 232 obtains a handle request containing the handle ID for the first child object from a client 110, the handle management application 232 may determine that the first child object is a child object of the parent object, determine a handle ID for the parent object, obtain the author attribute from the handle data of the parent object, and associate the author attribute of the parent object with the first child object by returning the author attribute of the parent object with the handle data of first child object to the requesting client 110. The handle management application 232 may determine that the first child object is a child object of the parent object via naming conventions for handle IDs or via data models for the handle data.

When the registry inheritance application 234 is implemented at each local handle registry, the DOA infrastructure may be configured to enable the automatic inheritance of attributes between related digital objects as described herein, without any modifications required at the requesting client 110. In other embodiments, the automatic inheritance of attributes between related digital objects may be enabled through modifications at the requesting client 110, without any modifications required at the local handle registries. As discussed below, modifications at the client 110 may be provided via a client inheritance application that modifies the operations of a web browser executing on the client 110 to perform the inheritance embodiments described herein.

Figure 3:
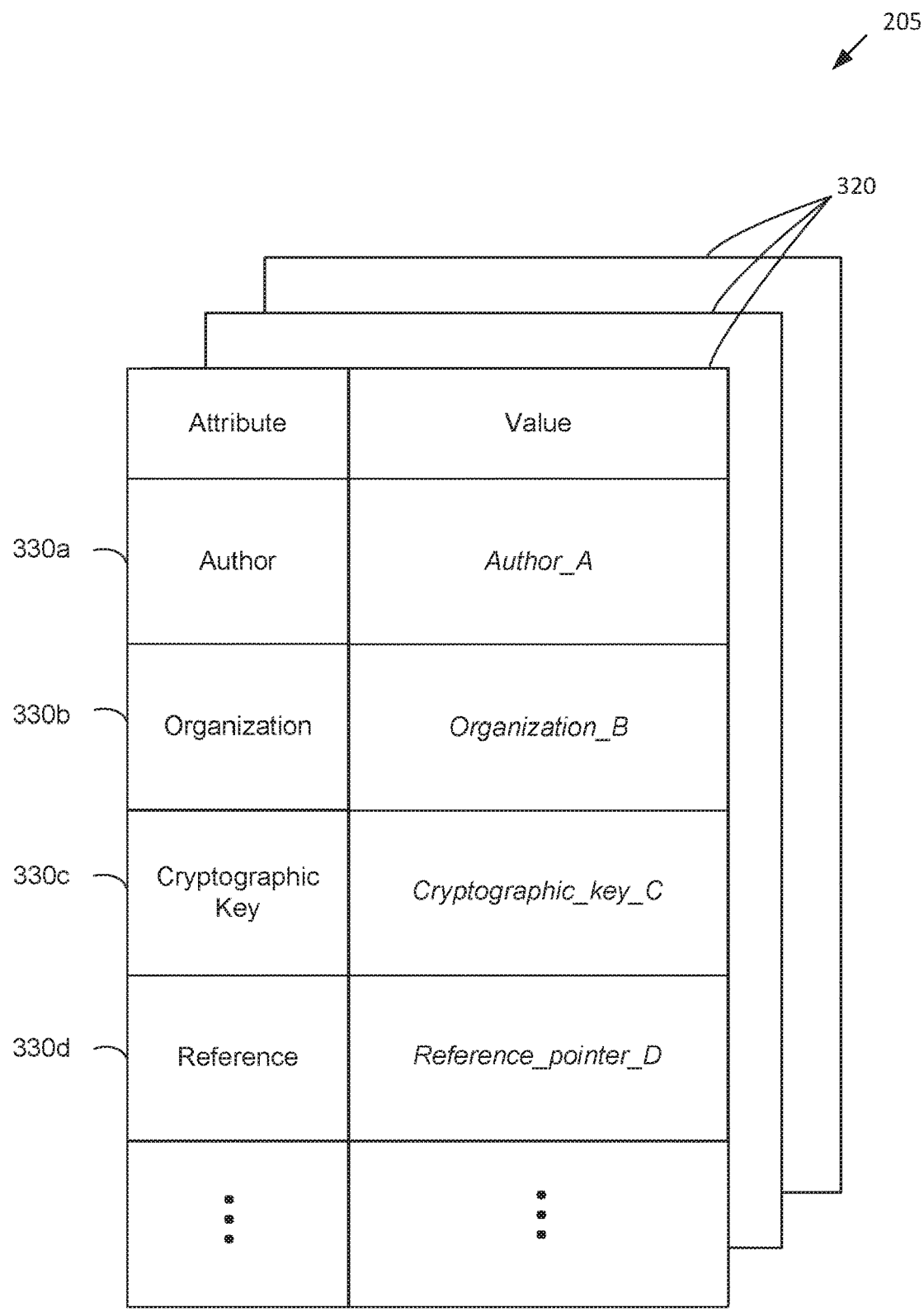
FIG. 3 is a block diagram illustrating handle data associated with a particular digital object in the distributed computing system of FIG. 1, according to according to various embodiments.

FIG. 3 is a block diagram illustrating a handle 205 associated with a particular digital object in the distributed computing system of FIG. 1, according to various embodiments. Handle 205 may be associated with a particular digital object 121 and may include a handle ID and a set of one or more records 320 storing various metadata associated with the digital object 121. The handle 205 may be stored in one of the local handle registries 140, 150, or 160 that manages the particular digital object 121. The handle 205 can include an arbitrary number of records 320, which can be in any technically feasible format. Each record 320 may comprise any arbitrary data size within the practical limits of the local handle registry and include any number of fields 330 (such as 330a, 330b, 330c, etc.), each field 330 storing a particular attribute/value pair associated with the digital object 121. The fields 330 may have an arbitrary length and format, or have a format that is specified for use in the distributed computing system 100. As shown in the example of FIG. 3, the fields 330 may include attribute/value pairs for the author, owning organization, cryptographic key, permissions, a reference/pointer to a current storage location of the digital object 121, and the like. As used herein, an attribute that is "specified" may refer to an attribute having valid values entered for the attribute (e.g., manually entered by a user or automatically entered), whereas an attribute that is "not specified" may refer to an attribute not included in the handle 205 or an attribute having null or void values. In other embodiments, the fields 330 may include different attribute/value pairs and/or a different number of attribute/value pairs.

Figure 4:
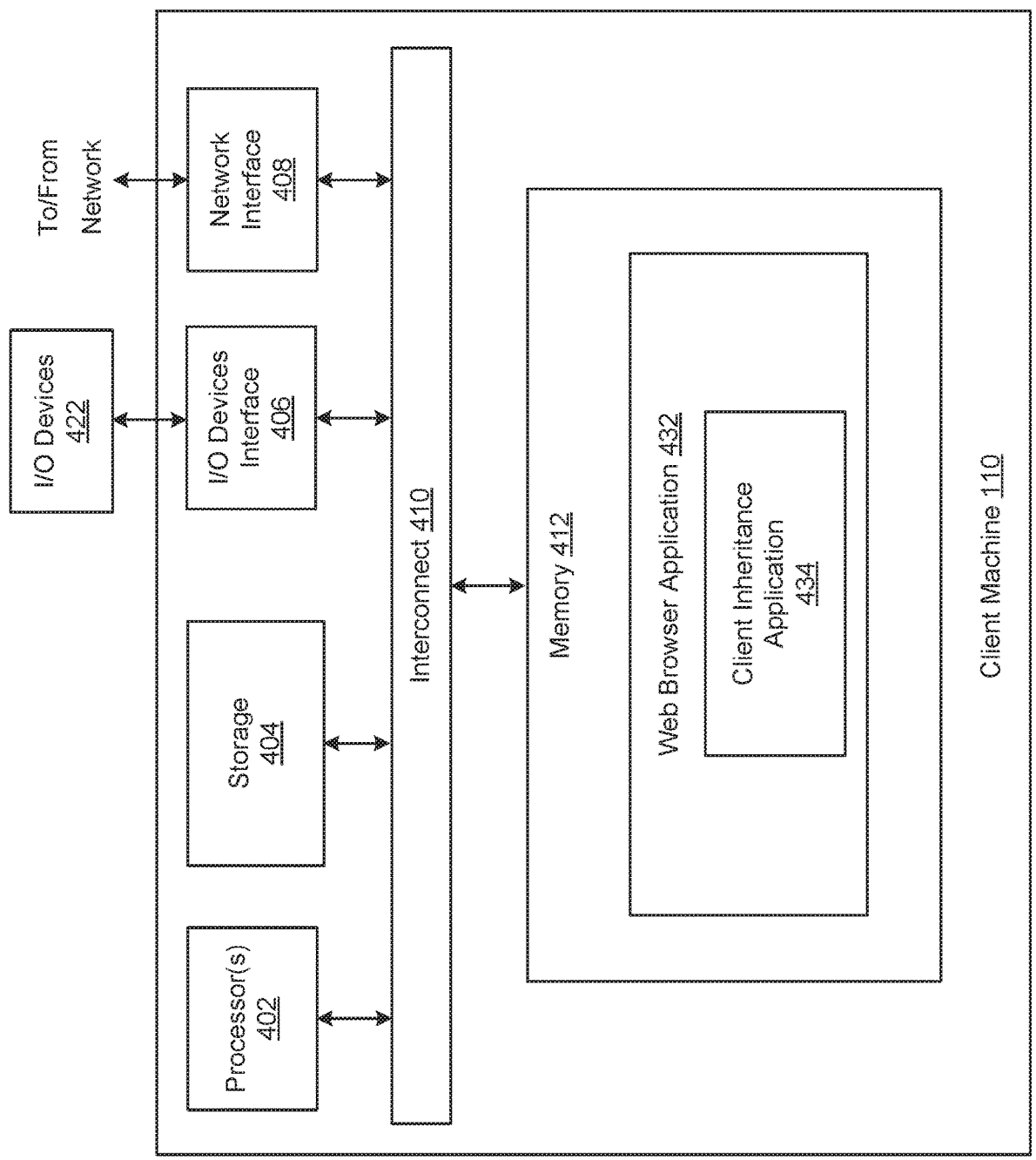
FIG. 4 is a more detailed illustration of a client machine of FIG. 1, according to various embodiments.

FIG. 4 is a more detailed illustration of a client machine 110 of FIG. 1, according to various embodiments. The client machine 110 may include, without limitation, a computing device that may be a personal computer, personal digital assistant, mobile phone, mobile device, or any other device suitable for implementing various embodiments. Each client 110 may be a computing device that is associated with a user and is coupled to the Internet. As shown, the client machine 110 may include, for example and without limitation, a central processing unit (CPU) 402, storage 404, an input/output (I/O) devices interface 406, a network interface 408, an interconnect 410, and a system memory 412.

Processor 402 may be any technically feasible hardware unit configured to process data and execute program instructions. Processor 402 could be, for example, a central processing unit (CPU), a graphics processing unit (GPU), an application specific integrated circuit (ASIC), and any combination thereof. The processor 402 retrieves and executes programming instructions stored in the system memory 412. Similarly, the processor 402 stores and retrieves application data residing in the system memory 412. The interconnect 410 facilitates transmission, such as of programming instructions and application data, between the processor 402, input/output (I/O) devices interface 406, storage 404, network interface 408, and system memory 412. Processor 402 communicates to other computing devices and systems via network interface 408, where network interface 408 is configured to transmit and receive data via a communications network. The I/O devices interface 406 is configured to receive input data from user I/O devices 422. The I/O devices 422 include devices for receiving input, devices for providing output, and devices for both receiving input and providing output. For example, I/O devices 422 may include a keyboard, a mouse or other pointing device, a speaker, a display device, and/or a touchscreen configured to receive input and provide output. The storage 404 may include, without limitation, a disk drive storage device.

Memory 412 may include any technically feasible storage medium for storing data and software applications. Memory 412 could be, for example, a random access memory (RAM) module. The memory 412 may include, without limitation, a web browser application 432 and a client inheritance application 434. In general, the web browser application 432 may comprise any web application that connects with the Internet and utilizes handle IDs to access digital objects. The web browser 432, when executed by the processor 402, communicates with a web server 180. The web server 180 may be, for example, a computing device coupled to the Internet and configured to provide access to various content and/or resources, including web pages, among other resources. Web server 180 may implement hyper-text transfer protocol (HTTP) to service HTTP requests submitted by the client 110 via the browser 432. In doing so, web server 180 may provide browser 432 with one or more handle IDs corresponding to digital objects. A given handle ID could, for example, be associated with an image (digital object) that is to be displayed on a web page served by web server 180. In response to receiving a given handle ID for the image, browser 432 may interact with the DOA global handle registry and a DOA local handle registry that collectively resolve the handle ID and return a handle 205 for the digital object. The returned handle 205 may include, for example, a reference/pointer to a current storage location for the image. The web browser 432 may use the reference/pointer to access a repository 120 storing the image, and accesses and retrieves the image from the repository 120.

The client inheritance application 434 may comprise a plug-in application or software component of the web browser 432 and provide functions and operations set forth in the embodiments described herein. In some embodiments, the client inheritance application 434 may enable the web browser 432 to provide automatic inheritance of at least one attribute between related digital objects. In particular, each child object may automatically inherit at least one predetermined attribute of a parent object. For example, an author attribute of the parent object may be specified in the handle 205 for the parent object, the parent object having a first child object that has a handle 205 that does not specify an author attribute. After the web browser 432 obtains a handle ID for the first child object, the web browser 432 may determine that the first child object is a child object of the parent object, determine a handle ID for the parent object, obtain the author attribute from the handle 205 of the parent object, and associate the author attribute of the parent object with the first child object. The web browser 432 may determine that the first child object is a child object of the parent object via naming conventions for handle IDs or via data models for handle data. In some embodiments, when the automatic inheritance of attributes between related digital objects is enabled via the client inheritance application 434 executing on the client 110, the DOA infrastructure does not require modifications via the registry inheritance application 234 executing on each local handle registry.

In some embodiments, for digital objects registered in the DOA infrastructure, at least one predetermined attribute may be automatically inherited between related digital objects via naming conventions for handle IDs or data models for handle data. As used herein, a "child object" comprises a digital object that inherits at least one attribute associated with a "parent object." As used herein, a predetermined attribute is "inherited" from a first object (e.g., parent object) to a second object (child object) by obtaining the predetermined attribute from the handle of the first object and associating the predetermined attribute with the second object. In some embodiments, the predetermined attribute is inherited from the first object to the second object only when the handle of the second object does not already specify the predetermined attribute (does not contain the predetermined attribute or does not contain a valid value in the field for the predetermined attribute). The at least one predetermined attribute may comprise, for example, any attribute or combination of attributes specified in the handle for the first object (e.g., parent object).

In Section II, attribute inheritance between related objects may be implemented using naming conventions for the handle IDs of digital objects 121. In Section III, attribute inheritance between related objects may be implemented using data models for handle data. Attribute inheritance using the naming conventions for handle IDs or data models for handle data may be implemented by modifying the registry inheritance application 234 (via the registry inheritance application 234) executing at each local handle registry of the DOA infrastructure, without requiring any modifications at the client machines 110 or the web browsers 432 executing thereon. In other embodiments, attribute inheritance using the naming conventions for handle IDs or data models for handle data may be implemented by modifying the web browser 432 (via the client inheritance application 434) executing at each client machine 110, without requiring any modifications at in the DOA infrastructure. In this regard, a "retriever machine" may refer to, for example, either the modified local handle registry or the modified client machine. In embodiments where the local handle registry is modified to enable the attribute inheritance features described herein, the "retriever machine" refers to the modified local handle registry. In embodiments where the client machine is modified to enable the attribute inheritance features described herein, the "retriever machine" refers to the modified client machine.

II. Attribute Inheritance Using Naming Conventions

The handle ID may comprise, for example, a prefix portion and a suffix portion, the suffix portion comprising an arbitrary identifier that is unique within the corresponding namespace identified by the prefix portion and the local handle registry managing the namespace. In some embodiments, naming conventions for handle IDs of digital objects may define a syntax for the suffix portion of the handle IDs to facilitate attribute inheritance between related digital objects. In these embodiments, the suffix portion of a handle ID may be divided into sub-portions that are used to identify parent-child relationships between digital objects. For example, for a particular digital object, the different sub-portions of the suffix portion of a handle ID may indicate that the particular digital object is a parent object, a child object, an identifier for a parent object, an identifier for a child object, or any combination thereof.

Figure 5:
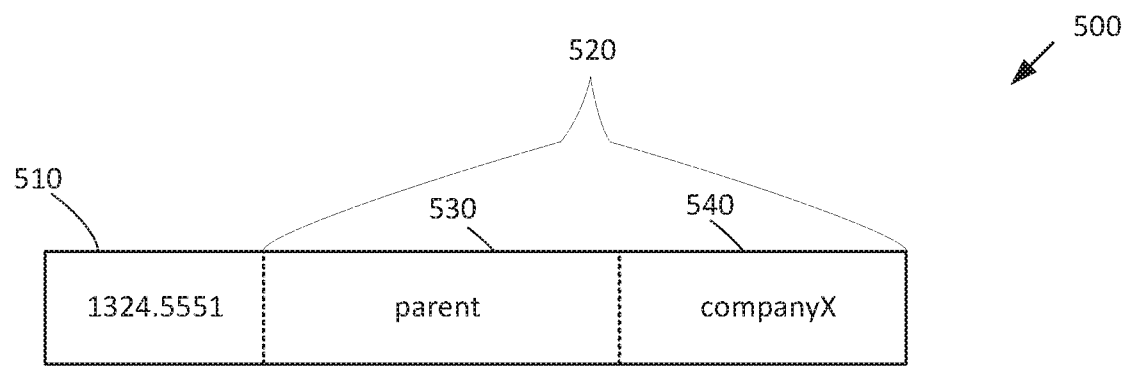
FIG. 5 is a conceptual illustration of a naming convention for a handle ID of a parent object, according to various embodiments.

FIG. 5 is a conceptual illustration of a naming convention for a handle ID 500 of a parent object, according to various embodiments. For a digital object comprising a parent object, the handle ID 500 may comprise a prefix portion 510 and a suffix portion 520, the suffix portion 520 comprising a first sub-portion 530 and a second sub-portion 540. The prefix portion 510 (e.g., "1324.5551") may define a namespace within the handle system and indicate a specific local handle registry that manages the handle for the parent object. The first sub-portion 530 may indicate that the digital object is a parent object. In particular, the first sub-portion 530 may contain a predetermined term that indicates that the handle ID 500 is associated with a parent object. In the example shown in FIG. 5, the predetermined term "parent" is used to indicate that the handle ID 500 is associated with a parent object. In other embodiments, any other predetermined term may be used, such as "parent," "primary," etc. The second sub-portion 540 may specify, for example, a unique identifier for the digital object that is unique within the corresponding namespace and local handle registry that manages the digital object. In the example shown in FIG. 5, the second sub-portion 540 indicates that "companyX" is the unique identifier for the parent object within the corresponding namespace and local handle registry.

Figure 6:
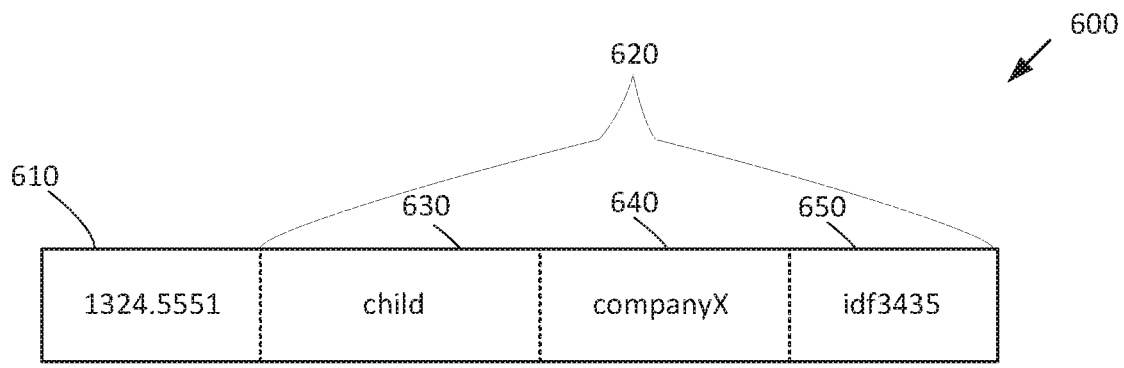
FIG. 6 is a conceptual illustration of a naming convention for a handle ID of a child object, according to various embodiments.

FIG. 6 is a conceptual illustration of a naming convention for a handle ID 600 of a child object, according to various embodiments. For a digital object comprising a child object, the handle ID 600 may comprise a prefix portion 610 and a suffix portion 620, the suffix portion 620 comprising a first sub-portion 630, a second sub-portion 640, and a third sub-portion 650. The prefix portion 610 (e.g., "1324.5551") may define a namespace within the handle system and indicate a specific local handle registry that manages the handle for the child object. In some embodiments, the prefix portion 610 of the handle ID for a child object is equal to the prefix portion 610 of the handle ID for the corresponding parent object. The first sub-portion 630 may indicate that the digital object is a child object and has a corresponding parent object. In particular, the first sub-portion 630 may contain a predetermined term that indicates that the handle ID 600 is associated with a child object, such as the predetermined term "child." In other embodiments, however, any other predetermined term may be used, such as "secondary," etc. The second sub-portion 640 may specify, for example, a unique identifier for the corresponding parent object that is unique within the namespace and local handle registry that manages the parent object. In the example shown in FIG. 6, the second sub-portion 640 indicates that "companyX" is the identifier for the corresponding parent object. The third sub-portion 650 may specify, for example, a unique identifier for the child object that is unique within the namespace and local handle registry that manages the parent object. In the example shown in FIG. 6, the third sub-portion 650 indicates that "idf3435" is the identifier for the child object. In some embodiments, the location of a sub-portion within the suffix may indicate the handle identifier refers to a child object and no explicit predetermined term is used for this purpose. Embodiments using other naming conventions to indicate parent and child relationships may be apparent to those with some skill in the art.

For the handle IDs for parent objects and child objects, various delimiters may be used to indicate a boundary between the prefix portion and suffix portion, and boundaries between the different sub-portions of the suffix portion. For example, the delimiter character "/" may be used to indicate a boundary between the prefix portion and suffix portion, and the delimiter character ":" may be used to indicate boundaries between the different sub-portions of the suffix portion. For example, a handle ID of a child object may be "1324.5551/child:companyX:idf3435." In other embodiments, other delimiter characters may be used to indicate such boundaries. Further, the sequence ordering of the different sub-portions within the suffix portion may be different than shown in FIGS. 5 and 6. For example, for a handle ID 500 for a parent object, the first sub-portion 530 may be placed after the second sub-portion 540. For a handle ID 600 for a child object, the first sub-portion 630, second sub-portion 640, and the third sub-portion 650 may also be placed in a different sequence than shown in FIG. 6.

For example, a parent object may comprise a template document for invention disclosure reports for a particular company or organization. The handle for the parent object may specify values for attributes including owning organization and cryptographic key. In this example, the retriever machine may be configured such that the attributes of owning organization and cryptographic key comprise two predetermined attributes that are to be inherited from parent objects to all child objects. In other embodiments, different attributes and/or a different number of attributes may be inherited from parent objects to child objects. For example, the handle ID for the parent object may be "1324.5551/parent:company," which indicates a parent object having an identifier "companyX." The parent object may have a plurality of child objects, each child object comprising a document for a specific invention disclosure report that is based on the template document of the parent object.

For example, a first child object of the parent object may have a handle ID "1324.5551/child:companyX:idf3435" which indicates a child object having an identifier "idf3435" that has a parent object with the identifier "companyX." In some embodiments, the prefix portion (e.g., "1324.5551") of the handle ID for a parent object is equal to the prefix portion (e.g., "1324.5551") of the handle ID for each child object of the parent object. In this example, it is assumed that the handle data for the first child object does not contain the two predetermined attributes for the owning organization and cryptographic key or does not specify values for the two predetermined attributes owning organization and cryptographic key (i.e., the corresponding fields for these two attributes contain null or void values in the handle data for the first child object). In some embodiments, if a child object already specifies values for one or more predetermined attributes to be inherited from a parent object, the child object does not inherit the one or more predetermined attributes from the parent object (i.e., does not inherit the values specified for the one or more predetermined attributes in the handle data for the parent object).

In operation, a retriever machine (e.g., a local handle registry 140 or client machine 110) may obtain a handle ID for a child object. By applying the naming conventions specified for handle IDs to the handle ID for a child object, the retriever machine may determine that the handle ID is associated with a child object having a parent object and then generate a handle ID for the parent object. Using the generated handle ID for the parent object, the retriever machine may obtain the handle for the parent object which includes at least one predetermined inherited attribute to be inherited by any child objects of the parent object. The retriever machine may then associate the at least one predetermined inherited attribute of the parent object with the child object, for example, by associating or including the at least one predetermined attribute in the handle data for the child object.

For example, the retriever machine may obtain the handle ID "1324.5551/child:companyX:idf3435" for the first child object. By applying the naming conventions to the handle ID for the first child object, the retriever machine may determine that the handle ID is associated with a child object "idf3435" having a parent object "companyX" and generates a handle ID for the parent object "companyX." The retriever machine may generate the handle ID for the parent object by using the same prefix portion "1324.5551" as for the handle ID for the child object, adding the indicator term "parent" to a first sub-portion 530 of the suffix 520 to indicate a parent object, and adding the identifier "companyX" for the parent object to a second sub-portion 540 of the suffix 520. Using the generated handle ID "1324.5551/parent:companyX" for the parent object, the retriever machine may obtain the handle for the parent object "company," which includes the owning organization and cryptographic key attributes that are to be inherited by any child objects of the parent object. The retriever machine may then associate the owning organization and cryptographic key attributes of the parent object "companyX" with the child object "idf3435."

If the invention disclosure reports for a particular organization over several years includes thousands of invention disclosure reports, a digital object and associated handle data may be created for each of the thousands of invention disclosure reports. Typically, if the name of the organization is changed, to update the "owning organization" attribute for all the digital objects would require an administrator to individually update the handle data for thousands of digital objects representing the invention disclosure reports to reflect the new name of the owning organization. According to an embodiment, by using the naming conventions to facilitate inheritance of attributes between related digital objects, only the owning organization attribute associated with the parent object (template document for invention disclosure reports) needs to be updated by the administrator, and the updated owning organization attribute will automatically be associated with each child object (a specific invention disclosure report) without requiring updating of the handle data for each child object. Also, in this example, the parent object and each child object may be in encrypted form and require a cryptographic key for decryption. Thus, to decrypt each child object requires that the cryptographic key attribute be specified only in the handle data for the parent object, and the cryptographic key attribute may be automatically inherited by each child object without requiring the cryptographic key attribute to be added to the handle data for each child object. In other embodiments, different attributes and/or a different number of attributes may be inherited from parent objects to child objects.

In the conceptual illustrations of a naming convention found in FIG. 5 and FIG. 6, the naming convention may include elements that explicitly identify a handle ID as either a parent object or a child object. In other embodiments, the relationship may be based on a nesting construct defined by the sub-portions of the handle ID suffix. In this case, if a second handle ID is comprised of all of the sub-portions making up a first handle ID plus contains additional sub-portions, then the second handle ID might be considered to be a child of the first handle ID. For example, a first handle ID might be "1324.5551/companyX:LegalDocumentTemplate" and a second handle ID that is a child of the first handle ID might be "1324.5551/company:LegalDocumentTemplate:NDA".

Figure 7:
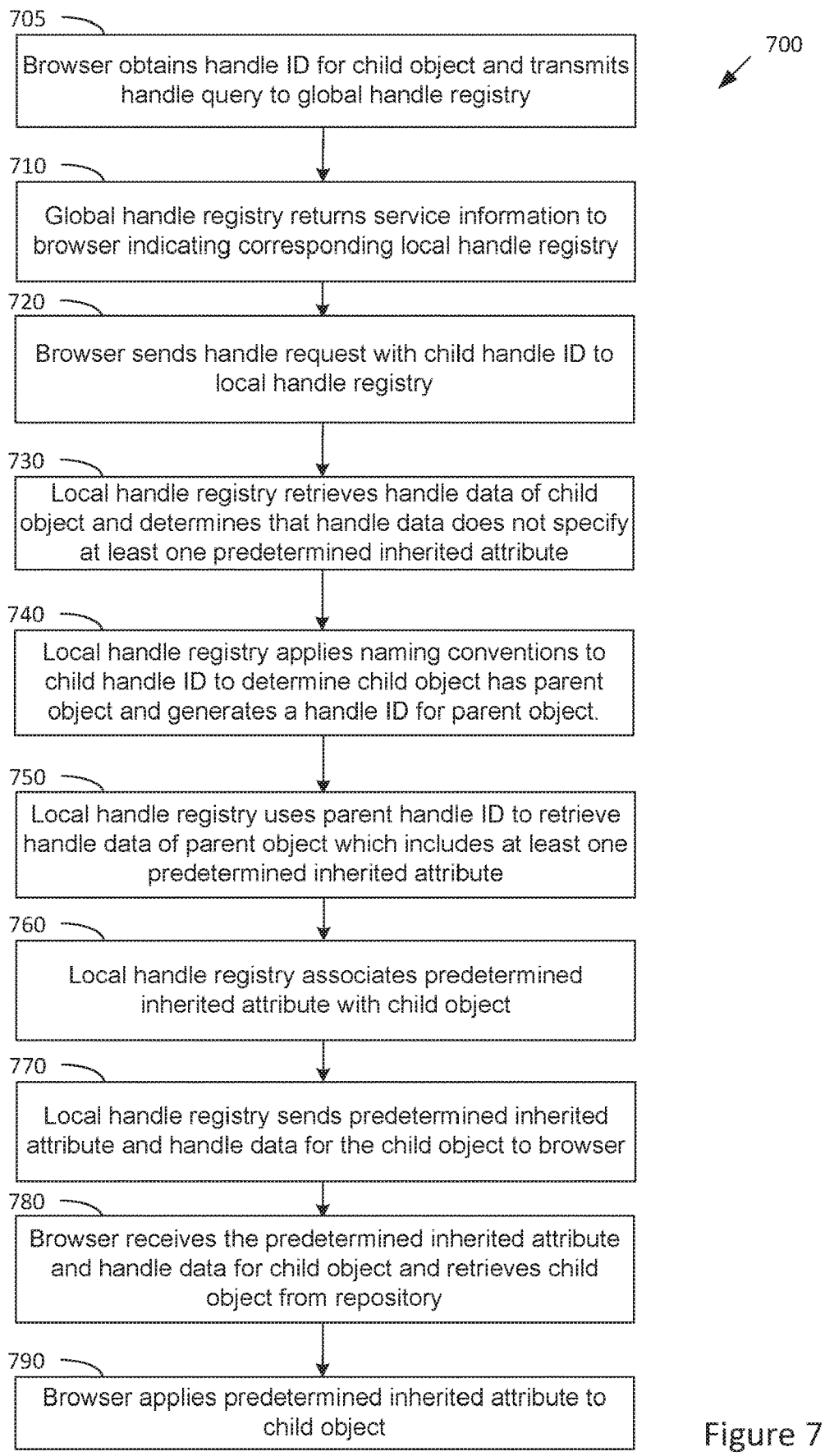
FIG. 7 is a flow diagram of a method for performing attribute inheritance at a local handle registry via naming conventions, according to various embodiments.

FIG. 7 is a flow diagram of a method 700 for performing attribute inheritance at a local handle registry via naming conventions, according to various embodiments. Although the method steps are described in conjunction with the systems of FIGS. 1-6, any system configured to perform the method steps, in any order, is within the scope of the various embodiments. In some embodiments, some steps of the method 700 are performed by a handle management application 232 and registry inheritance application 234 executing on a local handle registry 140 to provide attribute inheritance between related digital objects. In these embodiments, the web browsers 432 executing on client machines 110 do not require modification to perform the method 700.

As shown, a method 700 begins at step 705, where a web browser 432 executing on a client machine 110 obtains a handle ID for a child object and transmits a handle query containing the handle ID to the DOA global handle registry 130. For example, the browser 432 may interface with a web server 180 that provides the browser 432 with a handle ID corresponding to a digital object comprising a child object. At step 710, the DOA global handle registry 130 returns service information to the browser 432 indicating which of local handle registries 140, 150, or 160 manages the particular prefix of the handle ID, such as local handle registry 140.

At step 720, the browser 432 sends a handle request containing the handle ID of the child object to the appropriate local handle registry 140. At step 730, based on the handle ID, the local handle registry 140 then identifies and retrieves the handle data associated with the child object and determines that the handle data does not specify a value for at least one predetermined inherited attribute to be inherited from a parent object. At step 740, the local handle registry 140 applies the naming conventions specified for handle IDs to the handle ID for the child object to determine that the handle ID is associated with a child object having a parent object and generates a handle ID for the parent object. At step 750, the local handle registry 140 uses the generated handle ID for the parent object to identify and retrieve the handle data for the parent object which includes the at least one predetermined inherited attribute. At step 760, the local handle registry 140 associates the at least one predetermined inherited attribute with the child object, for example, by associating or including the at least one predetermined inherited attribute in the handle data for the child object. At step 770, the local handle registry 140 sends the at least one predetermined inherited attribute and the handle data for the child object to the browser 432.

At step 780, the browser 432 receives the at least one predetermined inherited attribute and the handle data for the child object which includes a reference/pointer to a current storage location for the child object and retrieves the child object from a repository 120 using the reference/pointer. At step 790, the browser 432 then applies the at least one predetermined inherited attribute to the child object. For example, if the at least one predetermined inherited attribute comprises a cryptographic key, the browser 432 may decrypt the child object using the cryptographic key. For example, if the at least one predetermined inherited attribute comprises an owner organization, the browser 432 may display the owner organization on a display device. The method 700 then ends.

Thus, the local handle registry 140 may enable the automatic inheritance of attributes between parent and child objects in a manner that is transparent to web browsers 432 interacting with the local handle registry 140, without any modifications required at the web browsers 432 or requesting client machines 110.

Figure 8:
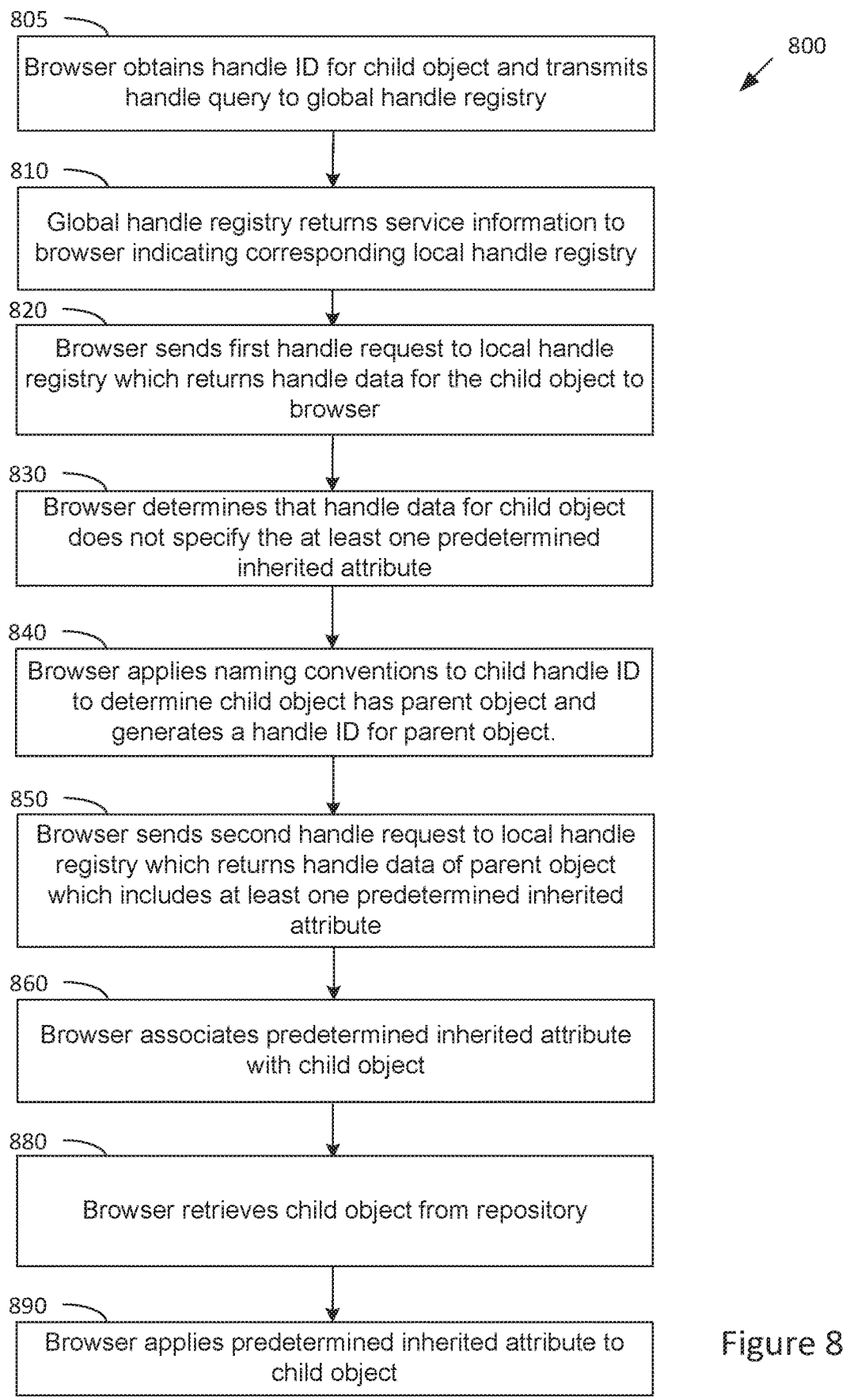
FIG. 8 is a flow diagram of a method for performing attribute inheritance at a web browser via naming conventions, according to various embodiments.

FIG. 8 is a flow diagram of a method 800 for performing attribute inheritance at a web browser via naming conventions, according to various embodiments. Although the method steps are described in conjunction with the systems of FIGS. 1-6, any system configured to perform the method steps, in any order, is within the scope of the various embodiments. In some embodiments, some steps of the method 800 are performed by a web browser application 432 and a client inheritance application 434 executing on a client machine 110 to provide attribute inheritance between related digital objects. In these embodiments, the handle management applications 232 executing on the local handle registries do not require modification to perform the method 800.

As shown, a method 800 begins at step 805, where a web browser 432 executing on a client machine 110 obtains a handle ID for a child object and transmits a handle query containing the handle ID to the DOA global handle registry 130. At step 810, the DOA global handle registry 130 returns service information to the browser 432 indicating which of local handle registries 140, 150, or 160 manages the particular prefix of the handle ID, such as local handle registry 140. At step 820, the browser 432 sends a first handle request containing the handle ID of the child object to the appropriate local handle registry 140 and the local handle registry 140 returns the handle data associated with the child object to the browser 432.

At step 830, browser 432 determines that the handle data for the child object does not specify a value for at least one predetermined inherited attribute to be inherited from a parent object. At step 840, the browser 432 applies the naming conventions specified for handle IDs to the handle ID for the child object to determine that the handle ID is associated with a child object having a parent object and generates a handle ID for the parent object. At step 850, the browser 432 sends a second handle request containing the handle ID of the parent object to the same local handle registry 140 and the same local handle registry 140 returns the handle data associated with the parent object to the browser 432 which includes the at least one predetermined inherited attribute. At step 860, the browser 432 associates the at least one predetermined inherited attribute with the child object, for example, by associating or including the at least one predetermined inherited attribute with the handle data for the child object.

At step 880, the browser 432 retrieves the child object from a repository 120 using a reference/pointer included in the handle data for the child object. At step 890, the browser 432 then applies the at least one predetermined inherited attribute to the child object. For example, if the at least one predetermined inherited attribute comprises a cryptographic key, the browser 432 may decrypt the child object using the cryptographic key. For example, if the at least one predetermined inherited attribute comprises an owner organization, the browser 432 may display the owner organization on a display device. The method 800 then ends.

In alternative embodiments, the naming conventions may enable chained inheritance whereby attributes may be inherited through more than two generation levels of related objects. For example, at least one attribute may be inherited from a parent object to a child object and at least one attribute may be inherited from that child object to a grandchild object. In these embodiments, the naming conventions may specify sub-portions of the suffix portion using a particular delimiter character (such as "I") to indicate a boundary between identifiers for different generation levels of related digital objects. For example, a handle ID for a parent object may be "1324.5551/docbase" whereby the suffix portion contains a unique identifier "docbase" for the parent object. A handle ID for a child object of the parent object may be "1324.5551/docbaseIjoesmith" whereby a first sub-portion of the suffix portion contains the unique identifier "docbase" for the parent object and a second sub-portion of the suffix portion contains the unique identifier "joesmith" for the child object. A handle ID for a grandchild object of the child object may be "1324.5551/docbaseIjoesmithIdoc122.pdf" whereby a first sub-portion of the suffix portion contains the unique identifier "docbase" for the parent object, a second sub-portion of the suffix portion contains the unique identifier "joesmith" for the child object, and a third sub-portion of the suffix portion contains the unique identifier "doc122.pdf" for the grandchild object. In these embodiments, the grandchild object "doc122.pdf" may inherit at least one attribute from the child object "joesmith" by associating at least one attribute from the handle data of the child object with the handle data of the grandchild object. The grandchild object "doc122.pdf" may also inherit at least one attribute from the parent object "docbase" by associating at least one attribute from the handle data of the parent object with the handle data of the grandchild object.

In further embodiments, the naming convention may enable multiple inheritances whereby a child object may inherit at least one attribute from each of a plurality of parent objects. For example, a child object may inherit at least one attribute from a first parent object and at least one attribute from a second parent object. In these embodiments, for a handle ID of a child object, the naming conventions may specify sub-portions of the suffix portion using a particular delimiter character (such as brackets) to indicate boundaries between identifiers for different parent objects from which the child object will inherit at least one attribute. For example, a handle ID for a child object may be "1324.5551/[companyx][business-sector]:osha-reqs.pdf" whereby a first sub-portion of the suffix portion contains a unique identifier "companyx" for a first parent object, a second sub-portion of the suffix portion contains a unique identifier "business-sector" for a second parent object, and a third sub-portion of the suffix portion contains a unique identifier "osha-reqs.pdf" for the child object. In these embodiments, the child object "osha-reqs.pdf" may inherit at least one attribute from the first parent object "companyx" and at least one attribute from the second parent object "business-sector."

In further embodiments, the naming convention may enable various combinations of chained inheritance and multiple inheritances. For example, a grandchild object may inherit at least one attribute from a first child object and at least one attribute from a second child object, through the first child object the grandchild object may also inherit at least one attribute from a first parent object and at least one attribute from a second parent object, and through the second child object the grandchild object may also inherit at least one attribute from a third parent object and at least one attribute from a fourth parent object.

III. Attribute Inheritance Using Data Models for Handle Data

In some embodiments, attribute inheritance between related objects may be implemented using data models for handle data. In these embodiments, a data model convention may be defined so that certain fields in the handle data are used to indicate a parent/child relationship between digital objects. In particular, the handle data associated with a digital object may include a "parent" field/attribute that indicates whether the digital object is a child object that has a parent object and the handle ID for the parent object. Since attribute inheritance may be implemented by modifying the data models for the handle data, the handle IDs of the digital objects may not need to be modified according to a naming convention, as in Section II. Thus, in the embodiments described in Section III, previous handle IDs may be used.

Figure 9:
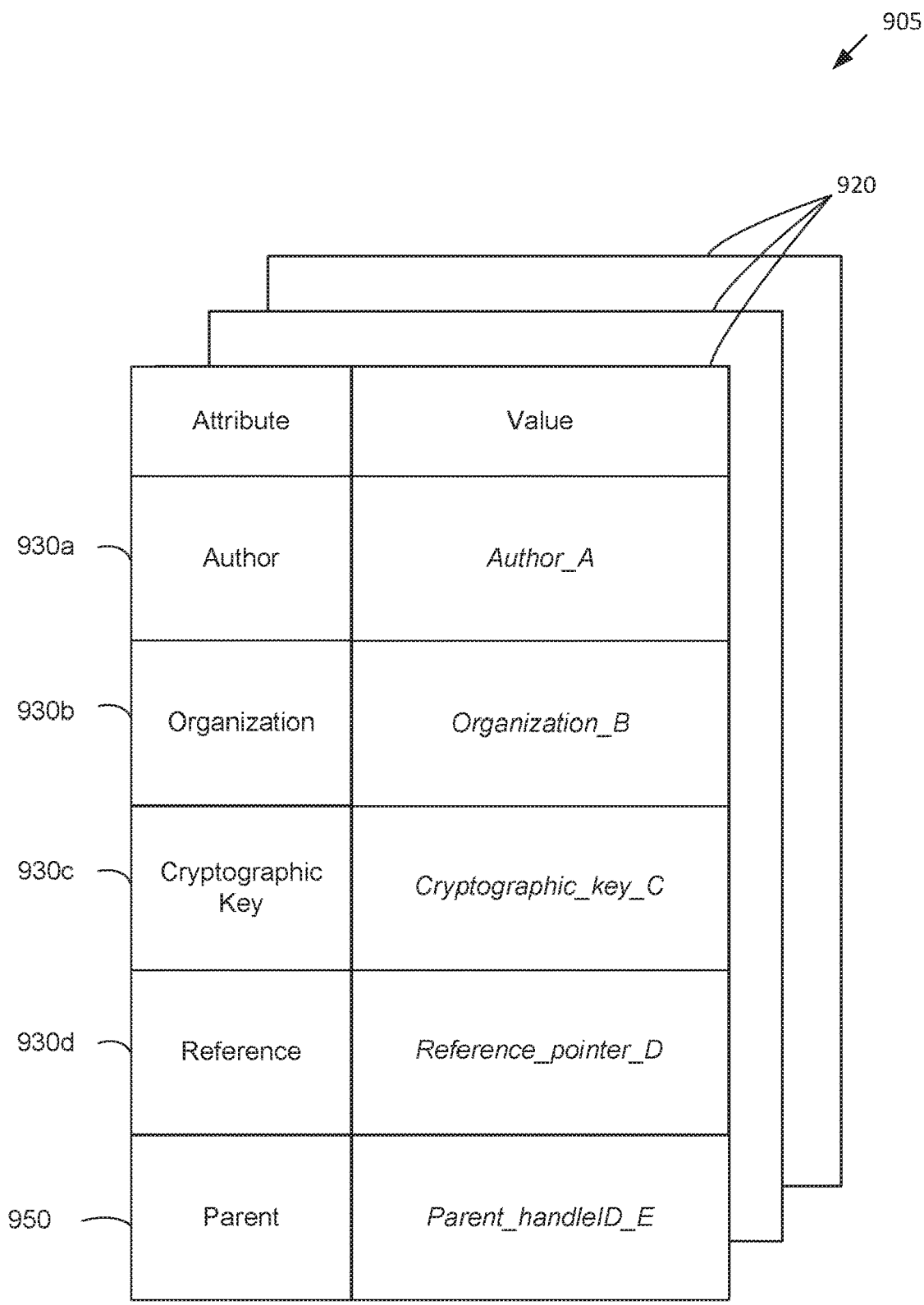
FIG. 9 is a block diagram illustrating a modified data model for handle data associated with a particular digital object in the distributed computing system of FIG. 1, according to according to various embodiments.

FIG. 9 is a block diagram illustrating a modified data model for handle data 905 associated with a particular digital object in the distributed computing system of FIG. 1, according to according to various embodiments. The handle data 905 associated with a particular digital object 121 may include, for example, a handle ID and a set of one or more records 920 storing various metadata associated with the digital object 121. Each record 920 may comprise any arbitrary data size and include any number of fields 930 (such as 930a, 930b, 930c, etc.), each field 930 storing a particular attribute/value pair associated with the digital object 121. As shown in the example of FIG. 9, the fields 930 may include attribute/value pairs for the author, owning organization, cryptographic key, permissions, a reference/pointer to a current storage location of the digital object 121, and the like. In some embodiments, an added field may comprise a "parent" field/attribute 950 that indicates whether the digital object is a child object that has a parent object and the handle ID for the parent object. According to an embodiment, if the "parent" field 950 is empty (contains null or void values), this indicates that the digital object is not a child object having a parent object. According to an embodiment, if the "parent" field 950 contains a particular handle ID, this indicates that the digital object is a child object that has a parent object, and the particular handle ID is the handle ID associated with the parent object.

Using the example from Section II, a parent object may comprise a template document for invention disclosure reports for a particular company/organization. The parent object may have a plurality of child objects, each child object comprising a document for a specific invention disclosure report that is based on the template document of the parent object. The handle ID for the parent object may be "1324.5551/companyXIDF" and the handle ID for a first child object may be "abcd.efgh/companyX-idf-3435." Note that in these embodiments, the prefix portion of the handle ID for the child object does not need to match the prefix portion of the handle ID for the child object and any conventional handle IDs for the child objects and parent objects may be used. Thus, the "parent" field 950 in the handle data 905 associated with the parent object would not include a handle ID or any other valid values (the parent attribute is not specified) to indicate that the parent object is not a child object having a parent object. The "parent" field 950 in the handle data 905 associated with the first child object would include the handle ID "1324.5551/companyXIDF" for the parent object to indicate that the first child object is a child object and the parent object is associated with the handle ID specified in the "parent" field 950.

In operation, a retriever machine (e.g., local handle registry 140 or client machine 110) may obtain a handle ID "abcd.efgh/companyX-idf-3435" for the first child object and use the handle ID to obtain handle data associated with the child object from a first local handle registry. In this example, the retriever machine may determine that the handle data for the first child object does not already specify values for the at least one predetermined inherited attribute. In some embodiments, if a child object already specifies values for the at least one predetermined inherited attribute, the child object does not inherit the predetermined inherited attribute from the parent object (i.e., does not inherit the values specified for the predetermined inherited attribute in the handle data for the parent object).

The retriever machine may then locate and examine the "parent" field 950 of the handle data to determine that the first child object is a child object and that the handle ID "1324.5551/companyXIDF" is associated with the parent object. The retriever machine uses the handle ID for the parent object to obtain handle data associated with the parent object from a second local handle registry. The second local handle registry may be the same or different local handle registry from the first local handle registry, depending on the prefix portions of the handle IDs for the child object and the parent object. The handle data associated with the parent object includes at least one predetermined inherited attribute to be inherited by any child objects of the parent object. The retriever machine then associates the at least one predetermined inherited attribute of the parent object with the child object, for example, by associating or including the at least one predetermined attribute with the handle data for the child object.

Thus, by using the data models to facilitate inheritance of attributes between related digital objects, the at least one predetermined inherited attribute of each child object can be easily updated by only updating the at least one predetermined inherited attribute in the handle data for the parent object. For example, if the name of the organization is changed, only the owning organization attribute associated with the parent object needs to be updated by the administrator, and the updated owning organization attribute will be automatically associated with each child object (via the data models) without requiring updating of the handle data for each child object. As a further example, the parent object and each child object may be in encrypted form and require a cryptographic key for decryption. Thus, to decrypt each child object requires that the cryptographic key attribute be specified only in the handle data for the parent object, and the cryptographic key attribute is automatically inherited by each child object (via the data models) without requiring the cryptographic key attribute to be added to the handle data for each child object.

Figure 10:
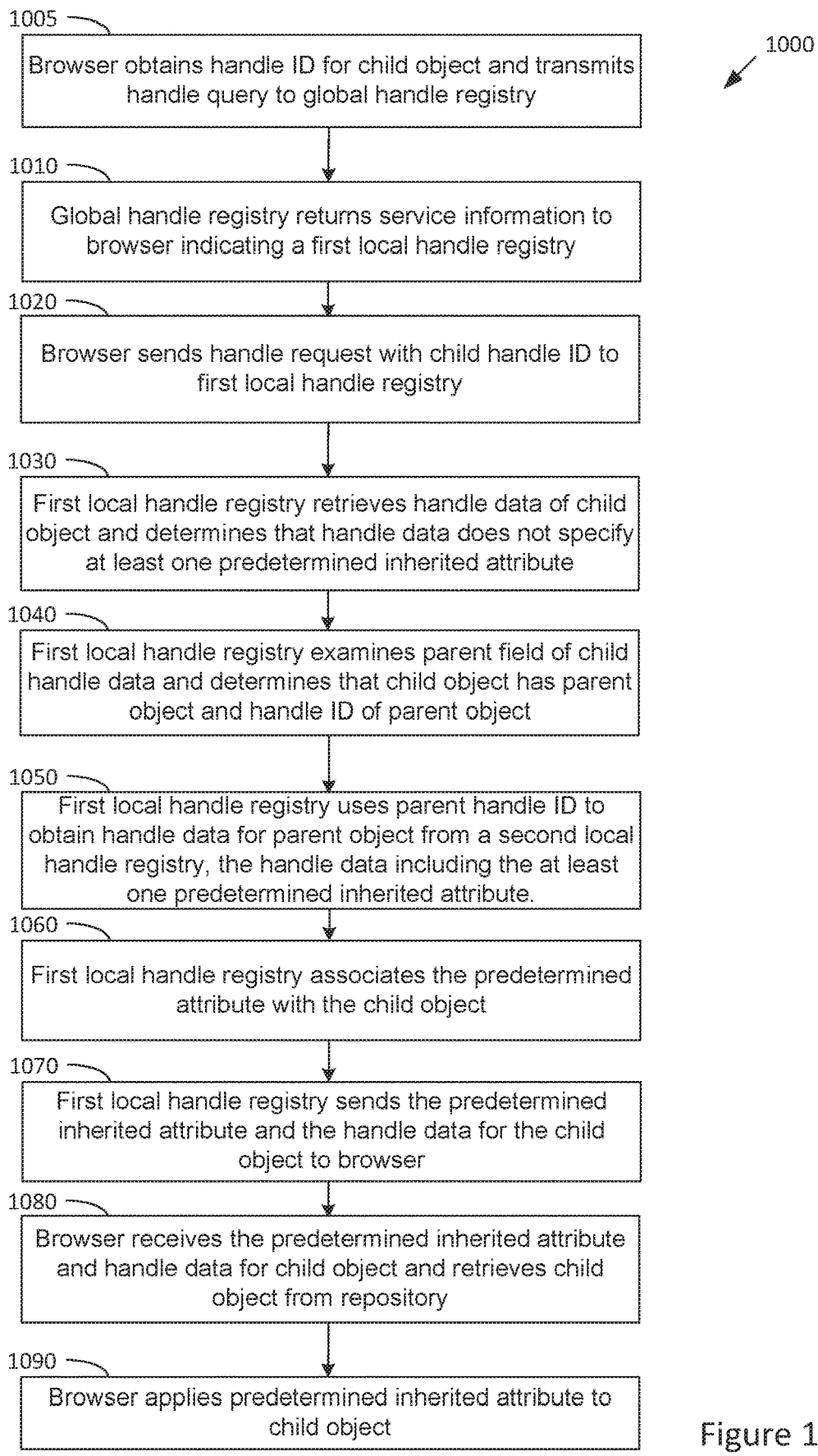
FIG. 10 is a flow diagram of a method for performing attribute inheritance at a local handle registry via data models for handle data, according to various embodiments.

FIG. 10 is a flow diagram of a method 1000 for performing attribute inheritance at a local handle registry via data models for handle data, according to various embodiments. Although the method steps are described in conjunction with the systems of FIGS. 1-4 and 9, any system configured to perform the method steps, in any order, is within the scope of the various embodiments. In some embodiments, some steps of the method 1000 are performed by a handle management application 232 and registry inheritance application 234 executing on a local handle registry 140 to provide attribute inheritance between related digital objects. According to an embodiment, the web browsers 432 executing on client machines 110 do not require modification to perform the method 1000.

As shown, a method 1000 begins at step 1005, where a web browser 432 executing on a client machine 110 obtains a handle ID for a child object and transmits a handle query containing the handle ID to the DOA global handle registry 130. For example, the browser 432 may interface with a web server 180 that provides the browser 432 with a handle ID corresponding to a digital object comprising a child object. At step 1010, the DOA global handle registry 130 returns service information to the browser 432 indicating a first local handle registry that manages the particular prefix of the handle ID. At step 1020, the browser 432 sends a handle request containing the handle ID of the child object to the first local handle registry. At step 1030, based on the handle ID, the first local handle registry then identifies and retrieves the handle data associated with the child object and determines that the handle data does not specify a value for at least one predetermined inherited attribute to be inherited from a parent object. At step 1040, the first local handle registry locates and examines the "parent" field 950 of the handle data associated with the child object and determines that the child object is a child object with a parent object having an associated handle ID specified in the "parent" field 950.

At step 1050, the first local handle registry uses the handle ID for the parent object to obtain the handle data for the parent object from a second local handle registry, the handle data including the at least one predetermined inherited attribute. The second local handle registry may be the same or different local handle registry from the first local handle registry, depending on the prefix portions of the handle IDs for the child object and the parent object. For example, if the second local handle registry is the same as the first local handle registry, the first local handle registry identifies and retrieves the handle data associated with the parent object from its local storage 204. For example, if the second local handle registry is different than the first local handle registry, the first local handle registry may submit a handle query containing the handle ID for the parent object to the DOA global handle registry 130, the DOA global handle registry 130 returns service information indicating the second local handle registry, the first local handle registry then sends a handle request containing the handle ID of the parent object to the second local handle registry, and the second local handle registry returns the handle data for the parent object to the first local handle registry.

At step 1060, the first local handle registry 140 associates the at least one predetermined inherited attribute with the child object, for example, by associating or including the at least one predetermined inherited attribute with the handle data for the child object. At step 1070, the first local handle registry 140 sends the at least one predetermined inherited attribute and the handle data for the child object to the browser 432. At step 1080, the browser 432 receives the at least one predetermined inherited attribute and the handle data for the child object which includes a reference/pointer to a current storage location for the child object and retrieves the child object from a repository 120 using the reference/pointer. At step 1090, the browser 432 then applies the at least one predetermined inherited attribute to the child object. For example, if the at least one predetermined inherited attribute comprises a cryptographic key, the browser 432 may decrypt the child object using the cryptographic key. For example, if the at least one predetermined inherited attribute comprises an owner organization, the browser 432 may display the owner organization on a display device. The method 1000 then ends.

Thus, the local handle registry may enable the automatic inheritance of attributes between parent and child objects in a manner that is transparent to web browsers 432 interacting with the local handle registry 140, without any modifications required at the web browsers 432 or requesting client machines 110.

Figure 11:
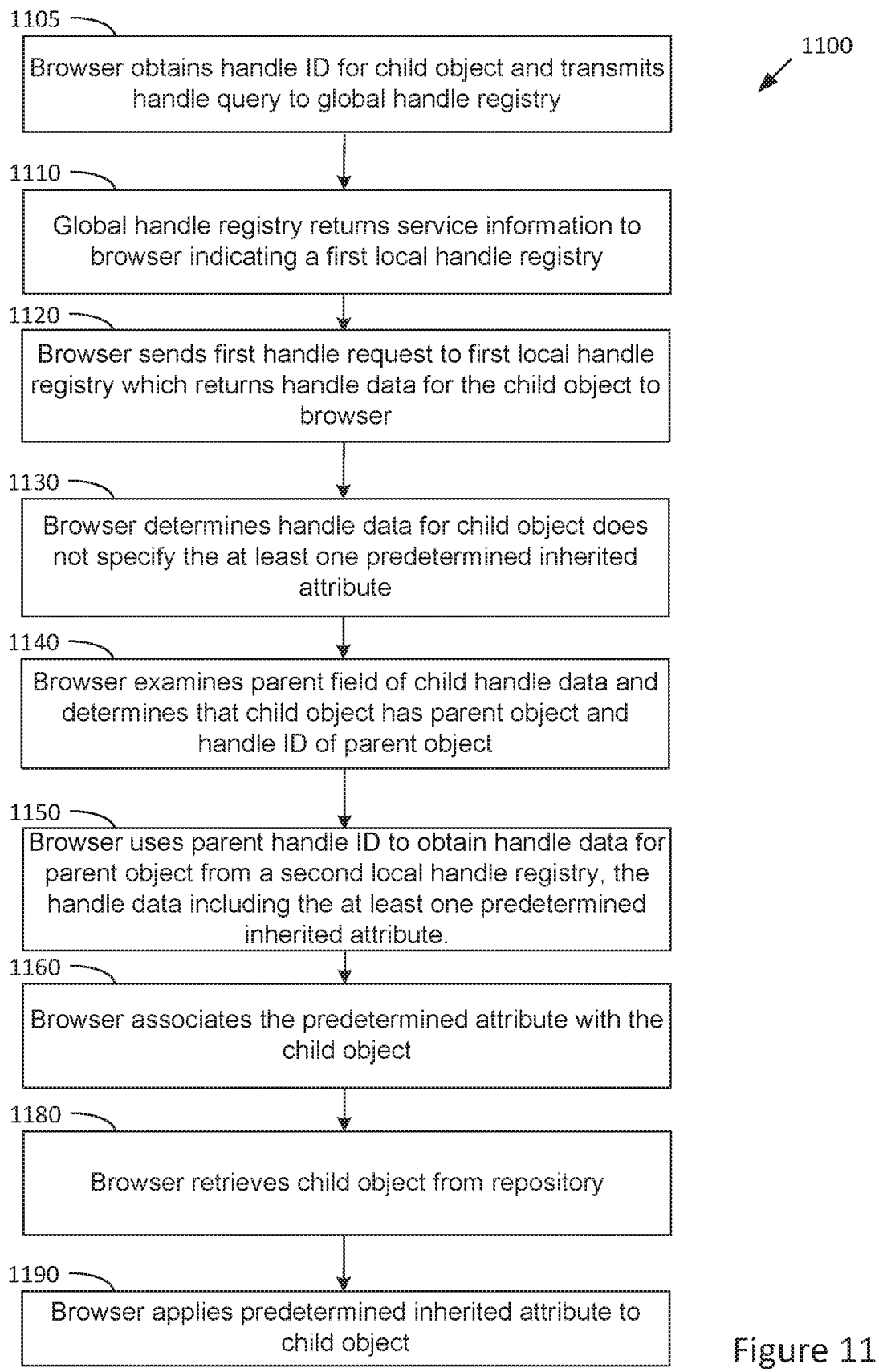
FIG. 11 is a flow diagram of a method for performing attribute inheritance at a web browser via data models for handle data, according to various embodiments.

FIG. 11 is a flow diagram of a method 1100 for performing attribute inheritance at a web browser via data models for handle data, according to various embodiments. Although the method steps are described in conjunction with the systems of FIGS. 1-4 and 9, any system configured to perform the method steps, in any order, is within the scope of the various embodiments. In some embodiments, some steps of the method 1100 are performed by a web browser application 432 and a client inheritance application 434 executing on a client machine 110 to provide attribute inheritance between related digital objects. According to an embodiment, the handle management applications 232 executing on the local handle registries do not require modification to perform the method 1100.

As shown, a method 1100 begins at step 1105, where a web browser 432 executing on a client machine 110 obtains a handle ID for a child object and transmits a first handle query containing the handle ID to the DOA global handle registry 130. At step 1110, the DOA global handle registry 130 returns service information to the browser 432 indicating a first local handle registry that manages the particular prefix of the handle ID. At step 1120, the browser 432 sends a first handle request containing the handle ID of the child object to the first local handle registry and the first local handle registry returns the handle data associated with the child object to the browser 432.

At step 1130, browser 432 determines that the handle data for the child object does not specify a value for at least one predetermined inherited attribute to be inherited from a parent object. At step 1140, the browser 432 locates and examines the "parent" field 950 of the handle data associated with the child object and determines that the child object is a child object with a parent object having an associated handle ID specified in the "parent" field 950. At step 1150, the browser 432 uses the handle ID for the parent object to obtain the handle data for the parent object from a second local handle registry, the handle data including the at least one predetermined inherited attribute. The second local handle registry may be the same or different local handle registry from the first local handle registry, depending on the prefix portions of the handle IDs for the child object and the parent object. The browser 432 may obtain the handle data for the parent object by submitting a second handle query containing the handle ID for the parent object to the DOA global handle registry 130, the DOA global handle registry 130 returns service information indicating the second local handle registry, the first local handle registry then sends a second handle request containing the handle ID of the parent object to the second local handle registry, and the second local handle registry returns the handle data for the parent object to the browser 432.

At step 1160, the browser 432 associates the at least one predetermined inherited attribute with the child object, for example, by associating or including the at least one predetermined inherited attribute with the handle data for the child object. At step 1180, the browser 432 retrieves the child object from a repository 120 using a reference/pointer included in the handle data for the child object. At step 1190, the browser 432 then applies the at least one predetermined inherited attribute to the child object. For example, if the at least one predetermined inherited attribute comprises a cryptographic key, the browser 432 may decrypt the child object using the cryptographic key. For example, if the at least one predetermined inherited attribute comprises an owner organization, the browser 432 may display the owner organization on a display device. The method 1100 then ends.

In alternative embodiments, the data models for handle data may enable chained inheritance whereby attributes may be inherited through more than two generation levels of related objects. For example, at least one attribute may be inherited from a parent object to a child object and at least one attribute may be inherited from that child object to a grandchild object. For example, the "parent" field 950 of handle data for a first child object may specify a handle ID for a parent object so that the first child object inherits at least one predetermined attribute from the parent object. Further, the "parent" field 950 of handle data for a first grandchild object may specify a handle ID for the first child object so that the first grandchild object inherits at least one predetermined attribute from the first child object, and so forth.

In further embodiments, the data models for handle data may enable multiple inheritances whereby a child object may inherit at least one attribute from each of a plurality of parent objects. For example, the "parent" field 950 of the handle data for a child object may specify a first handle ID for a first parent object and a second handle ID for a second parent object, whereby the child object inherits at least one predetermined attribute from the first parent object and inherits at least one predetermined attribute from the second parent object.

In further embodiments, the data models for handle data may enable various combinations of chained inheritance and multiple inheritances. For example, a grandchild object may inherit at least one attribute from a first child object and at least one attribute from a second child object, through the first child object the grandchild object may also inherit at least one attribute from a first parent object and at least one attribute from a second parent object, and through the second child object the grandchild object may also inherit at least one attribute from a third parent object and at least one attribute from a fourth parent object.

In some embodiments where client inheritance application 434 is incorporated into browser 432 or is executing on client machine 110, client inheritance application 434 may further optimize determination of inherited attributes by caching inherited attributes. In this case, the handle ID of a parent handle from which the inherited attributes were determined may serve as a cache lookup key. The client inheritance application 434 would then perform optimized lookups for inherited attributes by first using an identified parent handle ID as a cache lookup key to see if a handle for the parent handle has been cached. If parent handle ID is found in cache, client inheritance application 434 may then retrieve the identified parent handle from cache rather than retrieving the parent handle from a Local Handle Registry.

In sum, the disclosed techniques enable attribute inheritance between related objects using naming conventions for the handle IDs or data models for handle data. In particular, each child object of a parent object may automatically inherit at least one predetermined inherited attribute of the parent object. Attribute inheritance may be implemented by modifying the local handle registries via the registry inheritance application that executes at each local handle registry or modifying the client machines via the client inheritance application that executes at each client machine. When a retriever machine (local handle registry or client machine)

obtains a handle ID for a digital object, the retriever machine may determine that the digital object is a child object of a parent object, determine a handle ID for the parent object, obtain the author attribute from the handle data of the parent object, and associate the author attribute of the parent object with the child object. The retriever machine may determine that the digital object is a child object of the parent object via naming conventions for handle IDs of digital objects or via data models for the handle data of the digital objects.

The naming convention for handle IDs of digital objects may define a syntax for the suffix portion of the handle IDs to facilitate attribute inheritance between related digital objects. The suffix portion of a handle ID may be divided into sub-portions that are used to identify parent-child relationships between digital objects. For example, for a particular digital object, the different sub-portions of the suffix portion of a handle ID may indicate that the particular digital object is a parent object, a child object, an identifier for a parent object, an identifier for a child object, or any combination thereof. In other embodiments, attribute inheritance between related objects is implemented using a data model for handle data. In these embodiments, a data model convention is defined so that certain fields in the handle data are used to indicate parent/child relationships between digital objects. In particular, the handle data associated with a digital object may include a "parent" field/attribute that indicates whether the digital object is a child object that has a parent object and the handle ID for the parent object.

At least one advantage of the disclosed techniques is that at least one attribute of related digital objects registered in the DOA infrastructure may be automatically inherited between the related digital objects. In particular, each child object may be automatically associated with at least one predetermined attribute of a parent object via a naming convention or a data model for handle data. Therefore, the at least one predetermined attribute of the parent object does not need to be added to the handle data for each child object of the parent object, which reduces administrative overhead of adding the at least one predetermined attribute to the handle data for each child object as well as reduces the consumption of storage resources on the DOA infrastructure. Further, when a predetermined attribute of the parent object is updated, the updated predetermined attribute is automatically associated with each child object without requiring an update of the handle data of each child object of the parent object.

IV. Web Application Optimizations

A client machine 110 executing a web application (such as a web browser) may interface with a web server 180 that provides the web browser with a first handle ID for a first digital object that is a webpage. The webpage may be written in HTML (or any other markup language) and specify various content using tags and identifiers for the content. The tags in the webpage may specify several handle IDs for digital objects (such as images, videos, and the like) that comprise the content of the webpage. For example, the webpage may specify a second handle ID for a second digital object comprising an image and a third handle ID for a third digital object comprising a video. To generate and display the webpage with the image and video content of the webpage, the browser may interact with the DOA infrastructure (DOA global handle registry and the appropriate local handle registry) to resolve the first handle ID for the first digital object (webpage) to a reference/pointer to a repository that stores the webpage, establish a network connection with the repository and obtain the webpage from the repository, interact with the DOA infrastructure to resolve the second handle ID for the second digital object (image) to a reference/pointer to a repository that stores the second digital object, establish a network connection with the repository and obtain the second digital object from the repository, interact with the DOA infrastructure to resolve the third handle ID for the third digital object (video) to a reference/pointer to a repository that stores the third digital object, establish a network connection with the repository and obtain the third digital object from the repository, and so forth for each handle ID specified in the webpage. In the examples used herein, the embedded digital objects may comprise, for example, an image object and a video object. In other embodiments, a digital object embedded within a webpage may comprise, for example, any other type of digital object that may be embedded in a webpage.

Thus, for each handle ID of a desired digital object, the browser interacts with the DOA infrastructure to resolve the handle ID and retrieve the handle for the desired digital object in order to determine the location of the desired digital object including identifying the repository containing the digital object. Consequently, the technique for retrieving a plurality of digital objects from a same repository using handle IDs is inefficient as it requires a handle ID lookup (resolving of the handle ID to a reference/pointer to the digital object via the DOA infrastructure) for each digital object.

In an embodiment described herein, a plurality of digital objects accessed using handle IDs are stored to a same first repository. Each of the plurality of digital objects may be registered through the DOA infrastructure and have an assigned handle ID comprising a prefix portion and a suffix portion. For example, the plurality of digital objects may comprise a first digital object (webpage) having a first handle ID, a second digital object (image) having a second handle ID, and a third digital object (video) having a third handle ID, whereby the second and third handles IDs are specified within the webpage. The first handle ID of the webpage object may be specified as a handle ID having a prefix portion and a suffix portion. In some embodiments, each digital object is specified within the webpage by a handle ID comprising only a suffix portion (with no prefix portion), the suffix portion comprising an identifier that uniquely identifies the digital object within the same first repository on which the webpage is stored. A handle ID comprising only a suffix portion, with no prefix portion, may be referred to herein as a "relative reference." For example, the second handle ID of the image object may be specified by only a suffix portion that uniquely identifies the image object within the first repository. Likewise, the third handle ID of the video object is also specified by only a suffix portion that uniquely identifies the video object within the first repository.

In operation, the browser interacts with the DOA infrastructure to resolve the first handle ID for the webpage object, the DOA infrastructure returning handle data associated with the webpage object that includes a reference/pointer to a first repository which is the current storage location of the webpage object. Using the reference/pointer, the browser may establish a network connection with the first repository to retrieve the webpage object. The browser may then examine the webpage object to determine that it contains handle IDs comprising only the suffix portion. In these embodiments, the browser is configured so that when a webpage object contains an embedded handle ID for any additional digital objects comprising only the suffix portion, the browser may assume the digital objects are stored on the same repository on which the webpage object is stored. Thus, the browser will send a request for such an additional digital object to the same repository and retrieve the additional digital object from the same repository on which the webpage object is stored. The browser may retrieve these additional digital objects without performing a handle ID lookup via the DOA infrastructure and without establishing a network connection with the repository for each additional digital object. The browser may retrieve these additional digital objects using the same network connection with the repository that is used for retrieving the webpage object.

For example, the browser may examine the webpage object to determine that the second handle ID of the image object is specified by only a suffix portion, and thus submit a request (containing the suffix portion) for the image object to the same first repository using the same network connection as used for retrieving the webpage object and receive the image object from the first repository using the same network connection. Thus, the browser may retrieve the image object without performing a separate handle ID lookup for the image object and without establishing another network connection with the first repository. Likewise, the browser may then examine the webpage object to determine that the third handle ID of the video object is specified by only a suffix portion, and thus submit a request (containing the suffix portion) for the video object to the same first repository using the same network connection as used for retrieving the webpage object and image object and receive the video object from the first repository using the same network connection. Thus, the browser may retrieve the video object without performing a separate handle ID lookup for the video object and without establishing another network connection with the first repository. The browser may perform similar operations for each handle ID embedded in the webpage object that is specified by only a suffix portion.

In this manner, the web browser may continue to retrieve digital objects specified in the webpage object from the same repository to quickly and efficiently fill the content for the webpage object. Thus, the web application may more efficiently retrieve content for a webpage than in previous techniques.

Figure 12:
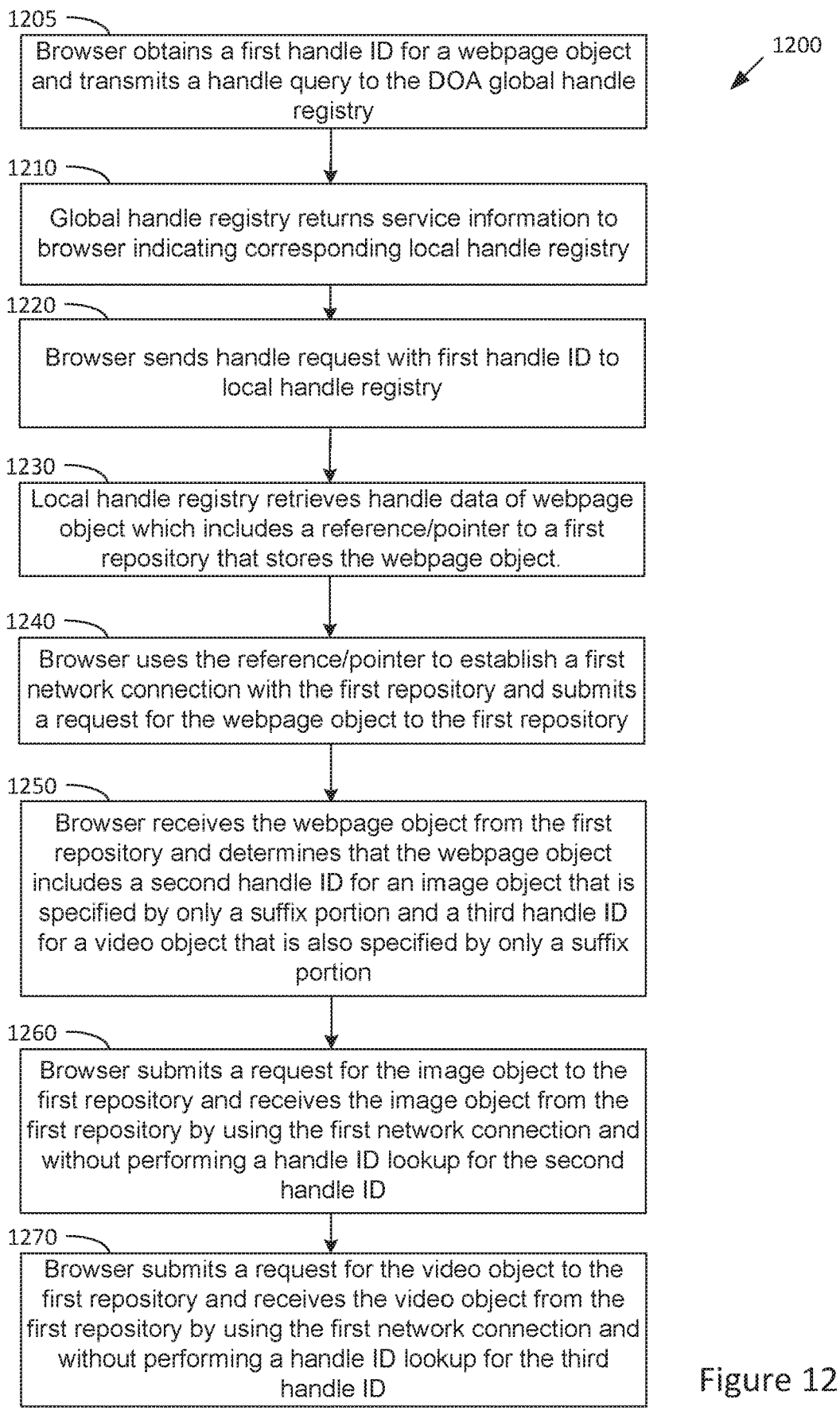
FIG. 12 is a flow diagram of a method for performing web application optimizations, according to various embodiments.

FIG. 12 is a flow diagram of a method 1200 for performing web application optimizations, according to various embodiments. Although the method steps are described in conjunction with the systems of FIGS. 1-6 and 9, any system configured to perform the method steps, in any order, is within the scope of the various embodiments. In some embodiments, some steps of the method 1200 are performed by a web browser executing on a client machine 110. In the examples used herein, the embedded digital objects comprise an image object and a video object. In other embodiments, a digital object embedded within a webpage may comprise any other type of digital object that may be embedded in a webpage.

As shown, a method 1200 begins at step 1205, where a web browser 432 executing on a client machine 110 obtains a first handle ID for a webpage object and transmits a handle query containing the first handle ID to the DOA global handle registry 130. At step 1210, the DOA global handle registry 130 returns service information to the browser 432 indicating which of local handle registries 140, 150, or 160 manages the particular prefix of the first handle ID, such as local handle registry 140. At step 1220, the browser 432 sends a handle request containing the first handle ID of the webpage object to the appropriate local handle registry 140.

At step 1230, based on the first handle ID, the local handle registry 140 then identifies and retrieves the handle data associated with the webpage object which includes a reference/pointer to a first repository that stores the webpage object. At step 1240, the browser 432 uses the reference/pointer to establish a first network connection with the first repository and submits a request for the webpage object to the first repository.

At step 1250, the browser 432 receives the webpage object from the first repository and determines that the webpage object includes a second handle ID for an image object that is specified by only a suffix portion (with no prefix portion) and a third handle ID for a video object that is also specified by only a suffix portion (with no prefix portion). At step 1260, the browser 432 submits a request for the image object to the first repository (the request containing the suffix portion of the second handle ID of the image object) and receives the image object from the first repository. The browser 432 may retrieve the image object from the first repository using the same first network connection as used for retrieving the webpage object and without performing a separate handle ID lookup via the DOA infrastructure for the second handle ID. At step 1270, the browser 432 submits a request for the video object to the first repository (the request containing the suffix portion of the third handle ID of the video object) and receives the video object from the first repository. The browser 432 may retrieve the video object from the first repository using the same first network connection as used for retrieving the webpage object and the image object and without performing a separate handle ID lookup via the DOA infrastructure for the third handle ID. The method 1200 then ends.

In another embodiment described herein, a plurality of digital objects may be stored to a same first repository where a first digital object contains references to the other digital objects in the plurality of digital objects. The first digital object may be registered through the DOA infrastructure and has an assigned conventional handle ID comprising a prefix portion and a suffix portion. The references in the first digital object to the other digital objects in the plurality of digital objects are comprised of identifiers of an arbitrary format but which can be used to identify the objects within the first repository. For example, the plurality of digital objects may comprise a first digital object (webpage) having a first handle ID, a second digital object (image) having a unique identifier for the image within first repository, and a third digital object (video) having a unique identifier for the video within the first repository whereby the identifiers for the second and third digital objects are specified within the webpage. The first handle ID of the webpage object may be specified as a conventional handle ID having a prefix portion and a suffix portion. In some embodiments, each digital object is specified within the webpage by an identifier comprising only the unique identifier that uniquely identifies the digital object within the same first repository on which the webpage is stored. Given that the unique identifiers are in the same repository as the webpage and this repository can be determined based on the repository from which the webpage was received, they are "relative references" that indicate to the web browser that the digital objects corresponding to the unique identifiers can be retrieved from the same repository that the webpage was retrieved from and that the unique identifier can be used to identify the digital objects when retrieving them from the repository.

In the embodiments above or in other embodiments where digital objects are referenced by a first digital object with relative references, a web browser may also apply handle data attributes of the first digital object to the digital objects identified by relative references from the first digital object, allowing the digital objects identified by the first digital object to inherit attributes of the first digital object. For example, if the handle data for a webpage has an attribute identifying an owner of the webpage, digital objects identified by relative references within the webpage may inherit the owner attribute and the web browser will consider the digital objects as having the same owner as the webpage.

In some embodiments, an identifier in a relative reference to a digital object from a first digital object where the relative reference identifies a digital object to be retrieved from the same repository as the first digital object may be resolved through a lookup mechanism that maps the identifier in the relative reference to an identifier that identifies the referenced digital object within the repository.

Figure 13:
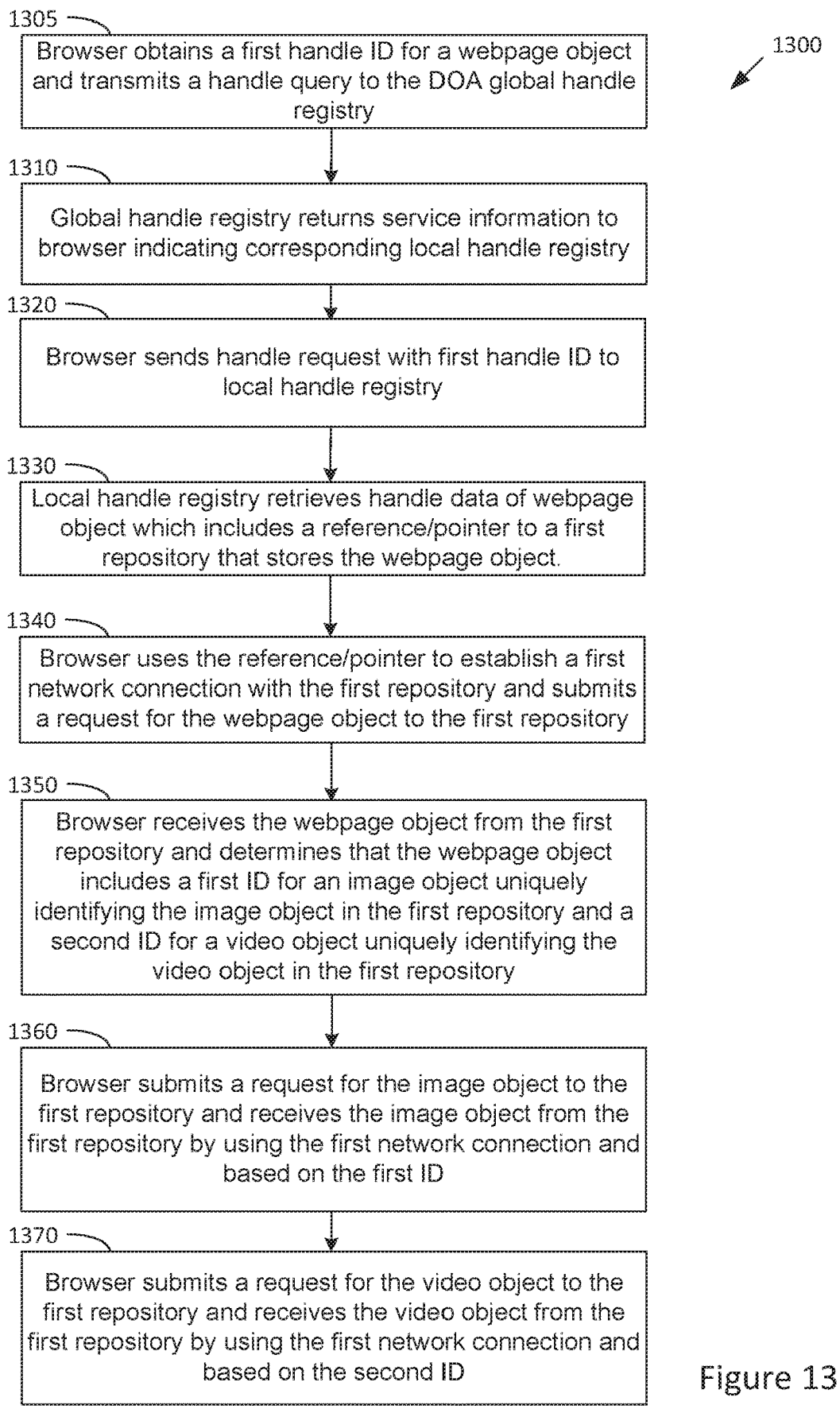
FIG. 13 is a flow diagram of a method for performing web application optimizations using relative references, according to various embodiments.

FIG. 13 is a flow diagram of a method 1300 for performing web application optimizations using relative references, according to various embodiments. Although the method steps are described in conjunction with the systems of FIGS. 1-6 and 9, any system configured to perform the method steps, in any order, is within the scope of the various embodiments. In some embodiments, some steps of the method 1300 are performed by a web browser executing on a client machine 110. In the examples used herein, the embedded digital objects comprise an image object and a video object. In other embodiments, a digital object embedded within a webpage may comprise any other type of digital object that may be embedded in a webpage.

As shown, a method 1300 begins at step 1305, where a web browser 432 executing on a client machine 110 obtains a first handle ID for a webpage object and transmits a handle query containing the first handle ID to the DOA global handle registry 130. At step 1310, the DOA global handle registry 130 returns service information to the browser 432 indicating which of local handle registries 140, 150, or 160 manages the particular prefix of the first handle ID, such as local handle registry 140. At step 1320, the browser 432 sends a handle request containing the first handle ID of the webpage object to the appropriate local handle registry 140. At step 1330, based on the first handle ID, the local handle registry 140 then identifies and retrieves the handle data associated with the webpage object which includes a reference/pointer to a first repository that stores the webpage object. At step 1340, the browser 432 uses the reference/pointer to establish a first network connection with the first repository and submits a request for the webpage object to the first repository.

At step 1350, the browser 432 receives the webpage object from the first repository and determines that the webpage object includes a first unique ID for an image object and a second unique ID for a video object. The first and second unique IDs identify the image object and the video object, respectively, within the first repository. At step 1360, the browser 432 submits a request for the image object to the first repository (the request containing the first ID) and receives the image object from the first repository. The browser 432 may retrieve the image object from the first repository using the same first network connection as used for retrieving the webpage object and without performing a separate handle ID lookup via the DOA infrastructure. At step 1370, the browser 432 submits a request for the video object to the first repository (the request containing the second ID) and receives the video object from the first repository. The browser 432 may retrieve the video object from the first repository using the same first network connection as used for retrieving the webpage object and the image object and without performing a separate handle ID lookup via the DOA infrastructure. The method 1300 then ends.

In some embodiments, a browser 432 may establish multiple connections to a repository from which it is retrieving digital objects identified by relative references. In these embodiments, browser 432 may reuse any of the multiple connections that is free at the time the browser 432 is attempting to retrieve a digital object identified by a relative reference.

In some embodiments, a browser 432 may establish a connection to a repository for the purpose of retrieving a digital object and may reuse the connection to retrieve additional digital objects from the repository that are identified by a full handle ID.

Aspects of the subject matter described herein are set out in the following numbered any of clauses.

1. In some embodiments, a computer-implemented method for attribute inheritance between digital objects in a digital object architecture (DOA), the method comprising: obtaining, at a retriever machine, a first handle identifier (ID) for a first digital object; based on the first handle ID, determining that the first digital object is a child object of a second digital object; generating a second handle ID for the second digital object; based on the second handle ID, obtaining handle data for the second digital object, the handle data specifying at least one attribute for the second digital object; and associating the at least one attribute for the second digital object with the first digital object.

2. The computer-implemented method of clause 1, wherein the retriever machine comprises a local handle registry of the DOA.

3. The computer-implemented method of any of clauses 1-2, wherein the retriever machine comprises a client machine executing a web application 4. The computer-implemented method of any of clauses 1-3, further comprising obtaining handle data for the first digital object, wherein associating the at least one attribute for the second digital object with the first digital object comprises including the at least one attribute for the second digital object in the handle data for the first digital object.

5. The computer-implemented method of any of clauses 1-4, further comprising: before associating the at least one attribute for the second digital object with the first digital object, obtaining handle data for the first digital object and determining that the handle data for the first digital object does not specify the at least one attribute for the second digital object.

6. The computer-implemented method of any of clauses 1-5, wherein generating the second handle ID for the second digital object comprises applying a naming convention to the first handle ID, the naming convention defining a sub-portion included in the first handle ID and the second handle ID that specify a parent-child relationship between digital objects.

7. The computer-implemented method of any of clauses 1-6, wherein the first handle ID for the first digital object comprises a first sub-portion for indicating that the first digital object is the child object having a parent object, and a second sub-portion including a unique identifier for the parent object.

8. The computer-implemented method of any of clauses 1-7, wherein the first handle ID for the first digital object comprises a first sub-portion for indicating that the first digital object is the child object, a second sub-portion for indicating a unique identifier for a parent object, and a third sub-portion for indicating a unique identifier for the first digital object.

9. The computer-implemented method of any of clauses 1-8, wherein the second handle ID for the second digital object comprises a first sub-portion for indicating that the second digital object is a parent object and a second sub-portion for indicating a unique identifier for the second digital object.

10. The computer-implemented method of any of clauses 1-9, wherein the handle ID for each digital object comprises a prefix portion indicating a namespace within the DOA, wherein the prefix portion of the first handle ID for the first digital object matches the prefix portion of the second handle ID for the second digital object.

11. In some embodiments, a computer-implemented method for attribute inheritance between digital objects in a digital object architecture (DOA), the method comprising: obtaining, at a retriever machine, handle data for a first digital object, the handle data specifying a parent attribute indicating that the first digital object is a child object of a second digital object and a handle identifier (ID) for the second digital object; based on the handle ID for the second digital object, obtaining handle data for the second digital object that specifies at least one attribute for the second digital object; and associating the at least one attribute for the second digital object with the first digital object.

12. The computer-implemented method of clause 11, wherein the retriever machine comprises a local handle registry of the DOA.

13. The computer-implemented method of any of clauses 11-12, wherein the retriever machine comprises a client machine executing a web application.

14. The computer-implemented method of any of clauses 11-13, wherein the handle data for the first digital object and the handle data for the second digital object are obtained from a same local handle registry of the DOA.

15. The computer-implemented method of any of clauses 11-14, wherein the handle data for the first digital object and the handle data for the second digital object are obtained from different local handle registries of the DOA.

16. The computer-implemented method of any of clauses 11-15, wherein associating the at least one attribute for the second digital object with the first digital object comprises including the at least one attribute for the second digital object in the handle data for the first digital object.

17. The computer-implemented method of any of clauses 11-16, further comprising: before associating the at least one attribute for the second digital object with the first digital object, determining that the handle data for the first digital object does not specify the at least one attribute for the second digital object.

18. The computer-implemented method of any of clauses 11-17, wherein: handle data for each digital object in the DOA includes the parent attribute, wherein, when handle data for particular digital object specifies a value for the parent attribute, the particular digital object is a child object of a parent object, wherein the value specifies a handle identifier (ID) for the parent object, and wherein, when handle data for particular digital object does not specify a value for the parent attribute, the particular digital object is not a child object of a parent object.

19. The computer-implemented method of any of clauses 11-18, further comprising: obtaining, at the retriever machine, handle data for a third digital object, the handle data specifying a parent attribute indicating that the third digital object is a child object of the first digital object and a handle identifier (ID) for the first digital object; based on the handle ID for the first digital object, obtaining handle data for the first digital object that specifies at least one attribute for the first digital object; and associating the at least one attribute for the first digital object with the third digital object.

20. The computer-implemented method of any of clauses 11-19, wherein the parent attribute further indicates that the first digital object is a child object of a third digital object and a handle identifier (ID) for the third digital object, the method further comprising: based on the handle ID for the third digital object, obtaining handle data for the third digital object that specifies at least one attribute for the third digital object; and associating the at least one attribute for the third digital object with the first digital object.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for applying attribute inheritance between digital objects in a digital object architecture (DOA), the method comprising:
    obtaining, at a retriever machine, a first handle identifier (ID) for a first digital object of the DOA, wherein the first handle ID is associated with first handle data for the first digital object;
    determining, based on the first handle ID, that the first digital object is a child object of a second digital object, wherein the second digital object is associated with a second handle ID that is different than the first handle ID;
    generating, based on the first handle ID, the second handle ID;
    obtaining, based on the second handle ID, second handle data for the second digital object, the second handle data specifying at least one attribute for the second digital object; and
    adding the at least one attribute for the second digital object from the second handle data to the first handle data, wherein adding the at least one attribute for the second digital object from the second handle data to the first handle data comprises combining the at least one attribute from the second handle data with the first handle data resulting in the first digital object inheriting the at least one attribute from the second digital object.

2. The computer-implemented method of claim 1, wherein the retriever machine comprises a local handle registry of the DOA.

3. The computer-implemented method of claim 1, wherein the retriever machine comprises a client machine executing a web application.

4. The computer-implemented method of claim 1, further comprising, before adding the at least one attribute for the second digital object to the first handle data for the first digital object:
    obtaining the first handle data for the first digital object; and
    determining that the first handle data for the first digital object does not specify the at least one attribute for the second digital object.

5. The computer-implemented method of claim 1, wherein generating, based on the first handle ID, the second handle ID for the second digital object comprises:
    identifying a naming convention defining a first sub-portion included in the first handle ID or a second sub-portion included in the second handle ID that specify a parent-child relationship between the second digital object and the first digital object; and
    generating, based on the naming convention, the second handle ID, wherein the first handle ID includes a first sub-portion that is not included in the second handle ID.

6. The computer-implemented method of claim 1, wherein the first handle ID for the first digital object comprises:
    a first sub-portion indicating that the first digital object is the child object having a parent-child relationship with a parent object, and
    a second sub-portion including a unique identifier for the parent object.

7. The computer-implemented method of claim 1, wherein the first handle ID for the first digital object comprises:
    a first sub-portion indicating that the first digital object is the child object,
    a second sub-portion indicating a unique identifier for a parent object, and
    a third sub-portion indicating a unique identifier for the first digital object.

8. The computer-implemented method of claim 1, wherein the second handle ID for the second digital object comprises:
    a first sub-portion indicating that the second digital object is a parent object; and
    a second sub-portion indicating a unique identifier for the second digital object.

9. The computer-implemented method of claim 1, wherein:
    the handle ID for each digital object comprises a prefix portion indicating a namespace within the DOA; and
    the prefix portion of the first handle ID for the first digital object matches the prefix portion of the second handle ID for the second digital object.

10. A computer-implemented method for applying attribute inheritance between digital objects in a digital object architecture (DOA), the method comprising:
    obtaining, at a retriever machine, first handle data for a first digital object of the DOA, wherein the first handle data specifies:
        a parent attribute indicating that the first digital object is a child object of a second digital object,
        a first handle identifier (ID) for the first digital object, and
        a second handle ID for the second digital object that is different than the first handle ID;

obtaining, based on the second handle ID, second handle data for the second digital object that specifies at least one attribute for the second digital object; and adding the at least one attribute for the second digital object from the second handle data to the first handle data, wherein adding the at least one attribute for the second digital object from the second handle data to the first handle data comprises combining the at least one attribute from the second handle data with the first handle data resulting in the first digital object inheriting the at least one attribute from the second digital object.

11. The computer-implemented method of claim 10, wherein the retriever machine comprises a local handle registry of the DOA.

12. The computer-implemented method of claim 10, wherein the retriever machine comprises a client machine executing a web application.

13. The computer-implemented method of claim 10, wherein the first handle data for the first digital object and the second handle data for the second digital object are obtained from a same local handle registry of the DOA.

14. The computer-implemented method of claim 10, wherein the first handle data for the first digital object and the second handle data for the second digital object are obtained from different local handle registries of the DOA.

15. The computer-implemented method of claim 10, further comprising:
before adding the at least one attribute for the second digital object to the first handle data for the first digital object, determining that the first handle data for the first digital object does not specify the at least one attribute for the second digital object.

16. The computer-implemented method of claim 10, wherein:
handle data for each digital object in the DOA includes the parent attribute,
when handle data for a particular digital object specifies a value for the parent attribute, the particular digital object is a child object of a parent object,
the value for the parent attribute specifies a handle ID for the parent object, and
when handle data for the particular digital object does not specify a value for the parent attribute, the particular digital object is not a child object of a parent object.

17. The computer-implemented method of claim 10, further comprising:
obtaining, at the retriever machine, third handle data for a third digital object, the third handle data specifying:
a parent attribute indicating that the third digital object is a child object of the first digital object, and
a first handle ID for the first digital object;
based on the first handle ID, obtaining the first handle data for the first digital object that specifies at least one attribute for the first digital object; and
adding the at least one attribute for the first digital object to the third handle data for the third digital object.

18. The computer-implemented method of claim 10, wherein:
the first handle data specifies:
the parent attribute indicating that the first digital object is a child object of a third digital object, and
a third handle ID for the third digital object that is different from the first handle ID or the second handle ID, and
the method further comprising:
obtaining, based on the third handle ID for the third digital object, third handle data for the third digital object that specifies at least one attribute for the third digital object; and
adding the at least one attribute for the third digital object to the first handle data for the first digital object.

* * * * *